(12) United States Patent
Miller

(10) Patent No.: US 7,823,082 B2
(45) Date of Patent: Oct. 26, 2010

(54) INTELLIGENCE DRIVEN ICONS AND CURSORS

(75) Inventor: Landon C. G. Miller, Tuscaloosa, AL (US)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 11/838,769

(22) Filed: Aug. 14, 2007

(65) Prior Publication Data

US 2009/0049401 A1 Feb. 19, 2009

(51) Int. Cl.
*G06F 3/48* (2006.01)
(52) U.S. Cl. .................. 715/810; 715/811; 715/812; 715/736; 715/734; 715/735
(58) Field of Classification Search .......... 715/811, 715/812, 810, 734–736
See application file for complete search history.

(56) References Cited

U.S. PATENT DOCUMENTS

| | | | |
|---|---|---|---|
| 3,988,725 A | 10/1976 | Doherty | |
| 4,365,238 A | 12/1982 | Kollin | |
| 4,622,540 A | 11/1986 | Guscott et al. | |
| 5,161,203 A | 11/1992 | Buckley | |
| 5,432,515 A | 7/1995 | O'Conner | |
| 5,495,237 A | 2/1996 | Yuasa et al. | |
| 5,566,092 A | 10/1996 | Wang et al. | |
| 5,809,499 A | 9/1998 | Wong et al. | |
| 5,896,082 A | 4/1999 | MacFarlane | |
| 5,940,529 A | 8/1999 | Buckley | |
| 6,249,241 B1 | 6/2001 | Jordan et al. | |
| 6,257,354 B1 | 7/2001 | Schrader et al. | |
| 6,427,121 B2 | 7/2002 | Brodie | |
| 6,437,692 B1 | 8/2002 | Petite et al. | |
| 6,515,586 B1 | 2/2003 | Wymore | |
| 6,735,630 B1 | 5/2004 | Gelvin et al. | |
| 6,930,596 B2 | 8/2005 | Kulesz et al. | |
| 6,987,459 B2 | 1/2006 | Tice | |
| 7,025,130 B2 | 4/2006 | Bailey et al. | |
| 7,053,770 B2 | 5/2006 | Ratiu et al. | |
| 7,148,803 B2 | 12/2006 | Bandy et al. | |
| 7,271,704 B2 | 9/2007 | McSheffrey et al. | |
| 7,475,428 B2 | 1/2009 | Smith et al. | |
| 7,496,472 B2 | 2/2009 | Seem | |
| 7,528,711 B2 | 5/2009 | Kates | |
| 7,693,589 B2 | 4/2010 | Miller | |
| 7,710,257 B2 | 5/2010 | Miller | |
| 7,710,258 B2 | 5/2010 | Miller | |
| 7,710,259 B2 | 5/2010 | Miller | |
| 7,710,260 B2 | 5/2010 | Miller | |
| 2002/0049914 A1* | 4/2002 | Inoue et al. | 713/201 |
| 2003/0171939 A1 | 9/2003 | Yagesh et al. | |

(Continued)

OTHER PUBLICATIONS

U.S. Appl. No. 11/837,955, Non-Final Office Action, dated Aug. 17, 2009.

(Continued)

*Primary Examiner*—Simon Ke
(74) *Attorney, Agent, or Firm*—Dillon & Yudell LLP

(57) ABSTRACT

A method is presented for representing emergent data in intelligent icons. The intelligent icons are visually coded to represent the emergent data. When logically linked, the visual coding of linked intelligent icons changes in accordance with how the intelligent icons are linked.

11 Claims, 25 Drawing Sheets

U.S. PATENT DOCUMENTS

| | | | |
|---|---|---|---|
| 2005/0124291 | A1 | 6/2005 | Hart et al. |
| 2005/0271266 | A1 | 12/2005 | Perrier |
| 2005/0275530 | A1 | 12/2005 | Kates |
| 2006/0176169 | A1 | 8/2006 | Doolin et al. |
| 2006/0262752 | A1* | 11/2006 | Moore et al. ................ 370/331 |
| 2007/0015548 | A1 | 1/2007 | Flick |
| 2007/0061022 | A1 | 3/2007 | Hoffberg-Borghesani et al. |
| 2007/0096899 | A1 | 5/2007 | Johnson |
| 2007/0097993 | A1 | 5/2007 | Bojahra et al. |
| 2007/0132846 | A1 | 6/2007 | Broad et al. |
| 2007/0167859 | A1 | 7/2007 | Finneran et al. |
| 2007/0250461 | A1 | 10/2007 | Sabe et al. |
| 2008/0094212 | A1 | 4/2008 | Breed |
| 2008/0109091 | A1 | 5/2008 | Joslin et al. |
| 2009/0022548 | A1 | 1/2009 | Bishop |
| 2009/0157569 | A1* | 6/2009 | Henby et al. ................ 705/500 |

OTHER PUBLICATIONS

U.S. Appl. No. 11/838,656, Non-Final Office Action dated Jun. 22, 2009.

U.S. Appl. No. 11/838,618, Non-Final Office Action dated Jun. 22, 2009.

U.S. Appl. No. 11/838,729, Non-Final Office Action dated May 11, 2009.

U.S. Appl. No. 11/838,739, Non-Final Office Action dated May 15, 2009.

U.S. Appl. No. 11/838,739, Final Office Action dated Nov. 13, 2009.

U.S. Appl. No. 11/838,684, Non-Final Office Action dated Jun. 22, 2009.

U.S. Appl. No. 11/838,695, Non-Final Office Action dated Jun. 22, 2009.

U.S. Appl. No. 11/837,921, Non-Final Office Action dated Dec. 29, 2009.

U.S. Appl. No. 11/838,729, Notice of Allowance dated Nov. 17, 2009.

U.S. Appl. No. 11/838,684, Notice of Allowance dated Dec. 21, 2009.

U.S. Appl. No. 11/838,637, Non-Final Office Action dated Jan. 20, 2010.

U.S. Appl. No. 11/837,955, Final Office Action dated Mar. 5, 2010.

U.S. Appl. No. 11/838,739, Notice of Allowance dated Feb. 26, 2010.

U.S. Appl. No. 11/838,618, Notice of Allowance dated Dec. 17, 2009.

U.S. Appl. No. 11/838,656, Notice of Allowance dated Dec. 17, 2009.

U.S. Appl. No. 11/838,695, Notice of Allowance dated Dec. 17, 2009.

* cited by examiner

NON-ATTRIBUTED FINANCIAL MARKET EXAMPLES 
| | | | | | | | | | |
|---|---|---|---|---|---|---|---|---|---|
| 863.41 | 863.90 | ... | 15 | 863.41 | 863.90 | 872.41 | 1725.81 | 1726.79 | 1743.82 |
| 827.89 | | 836.90 | 14 | 827.89 | 828.38 | 836.90 | 1654.77 | 1655.76 | 1672.78 |
| 762.37 | | ... | 13 | 762.37 | 762.86 | 771.38 | 1523.73 | 1524.72 | 1541.74 |
| 733.86 | 734.35 | 742.86 | 12 | 733.86 | 734.35 | 742.86 | 1466.71 | 1467.69 | 1484.72 |
| 677.32 | | ... | 11 | 677.32 | 677.81 | 686.32 | 1353.63 | 1354.61 | 1371.64 |
| 611.80 | 612.29 | 620.80 | 10 | 611.80 | 612.29 | 620.80 | 1222.59 | 1223.57 | 1240.60 |
| 554.78 | | 563.78 | 9 | 554.78 | 555.27 | 563.78 | 1108.54 | 1109.53 | 1126.55 |
| 511.26 | 511.75 | ... | 8 | 511.26 | 511.75 | 520.26 | 1021.51 | 1022.49 | 1039.52 |
| 437.73 | | 446.73 | 7 | 437.73 | 438.22 | 446.73 | 874.44 | 875.43 | 892.45 |
| 388.19 | | ... | 6 | 388.19 | 388.68 | 397.20 | 775.31 | 776.36 | 793.38 |
| 331.17 | 331.66 | 340.17 | 5 | 331.17 | 331.66 | 340.17 | 661.33 | 662.31 | 679.34 |
| 273.66 | | ... | 4 | 273.66 | 274.15 | 282.66 | 546.30 | 547.29 | 564.31 |
| 217.11 | 217.61 | 226.12 | 3 | 217.11 | | 226.12 | 433.22 | 434.20 | 451.23 |
| 143.58 | | ... | 2 | 143.58 | | | 286.15 | 287.14 | 304.16 |
| 79.06 | 79.55 | 88.06 | 1 | 79.06 | 79.55 | 88.06 | 157.11 | 158.09 | 175.12 |
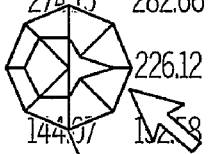
1904
MOUSE CLICK "PULLS" INSTANT
REAL TIME ANALYSIS
FIG. 19

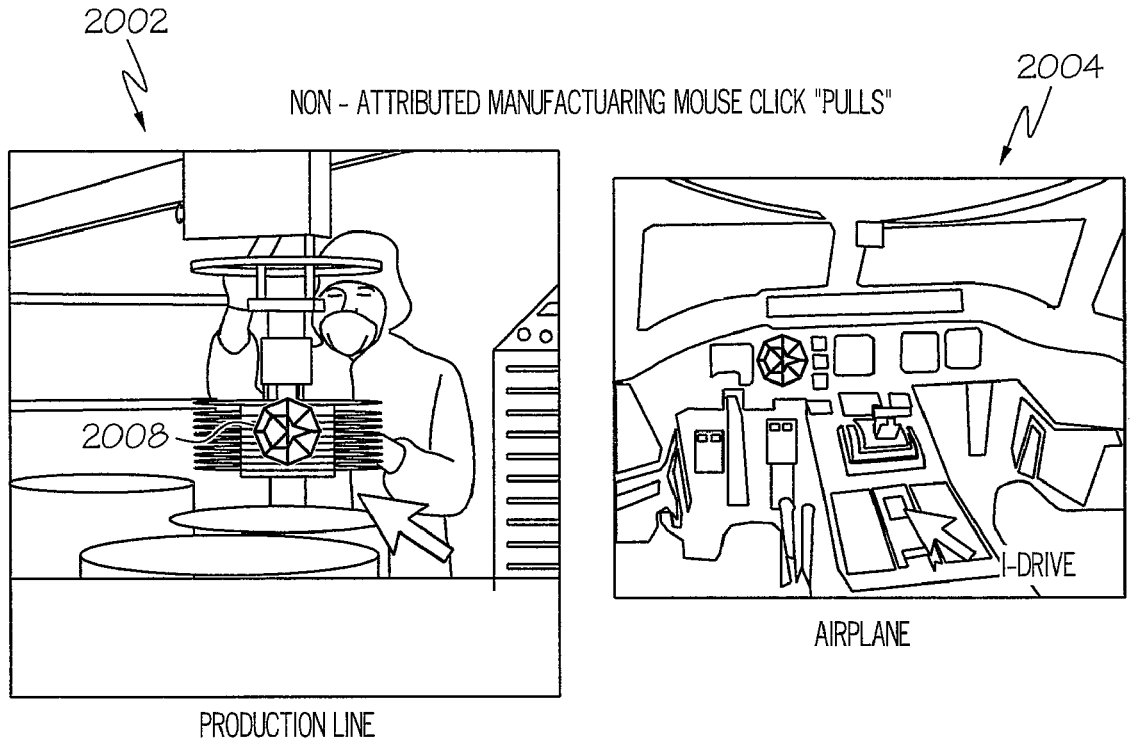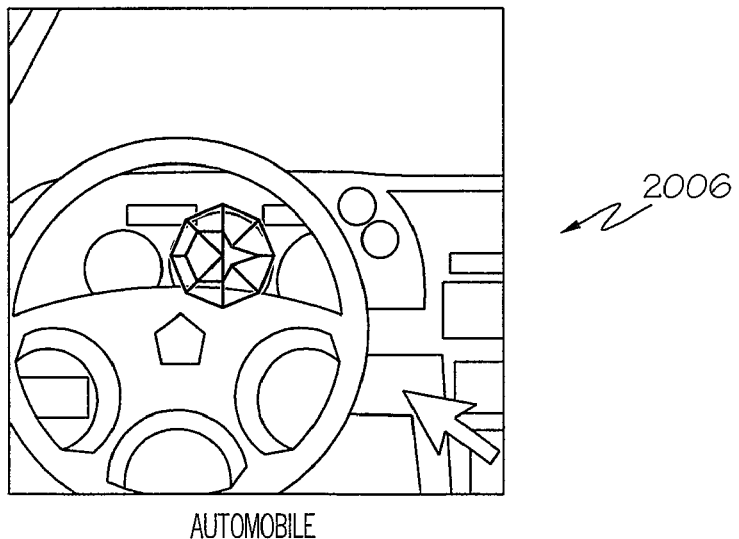
FIG. 20

INTELLIGENCE DRIVEN ICONS AND CURSORS

The present invention is related to the subject matter of the following commonly assigned, copending U.S. patent applications: (1) Ser. No. 11/837,886 entitled "Water Friend or Foe System for Global Vessel Identification and Tracking", filed Aug. 13, 2007; (2) Ser. No. 11/837,955 entitled "Emergent Information Database Management System", filed Aug. 13, 2007; (3) Ser. No. 11/837,921 entitled "Emergent Information Pattern Driven Sensor Networks", filed Aug. 13, 2007; (4) Ser. No. 11/838,729 entitled "Anomaly Anti-Pattern", filed Aug. 13, 2007; and (5) Ser. No. 11/838,684 entitled "Pattern Driven Effectuator System", filed Aug. 13, 2007. The content of the above-referenced applications is incorporated herein by reference.

BACKGROUND OF THE INVENTION

1. Technical Field

The present disclosure relates to the field of sensor networks and intelligently displaying the emergent information that their sensors develop.

2. Description of the Related Art

Currently, system sensors collect data in a non-intelligent manner. That is, even if a sensor has limited intelligence (e.g., a camera that automatically tracks moving objects), most of the data collected by the sensors, and then transmitted to a controller, is meaningless. That is, sensors typically transmit data in a continuous manner, such that most of the transmitted data is "dead air" in which nothing of interest is happening. To find subject matter of interest, the controller must perform either extensive data mining or use programs that search for patterns of previously stored data. Most searching is for simple, single sensor type threshold events. The data is then typically displayed in tabular form.

SUMMARY OF THE INVENTION

A method is presented for representing emergent data in intelligent icons. The intelligent icons are visually coded to represent the emergent data. When logically linked, the visual coding of linked intelligent icons changes in accordance with how the intelligent icons are linked.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 19 illustrates the use of data pull with intelligent icons in a financial market scenario;

FIG. 20 illustrates the use of data pull with intelligent icons in production line, aeronautical, and automotive scenarios;

DETAILED DESCRIPTION OF THE PREFERRED EMBODIMENT

Figure 1:
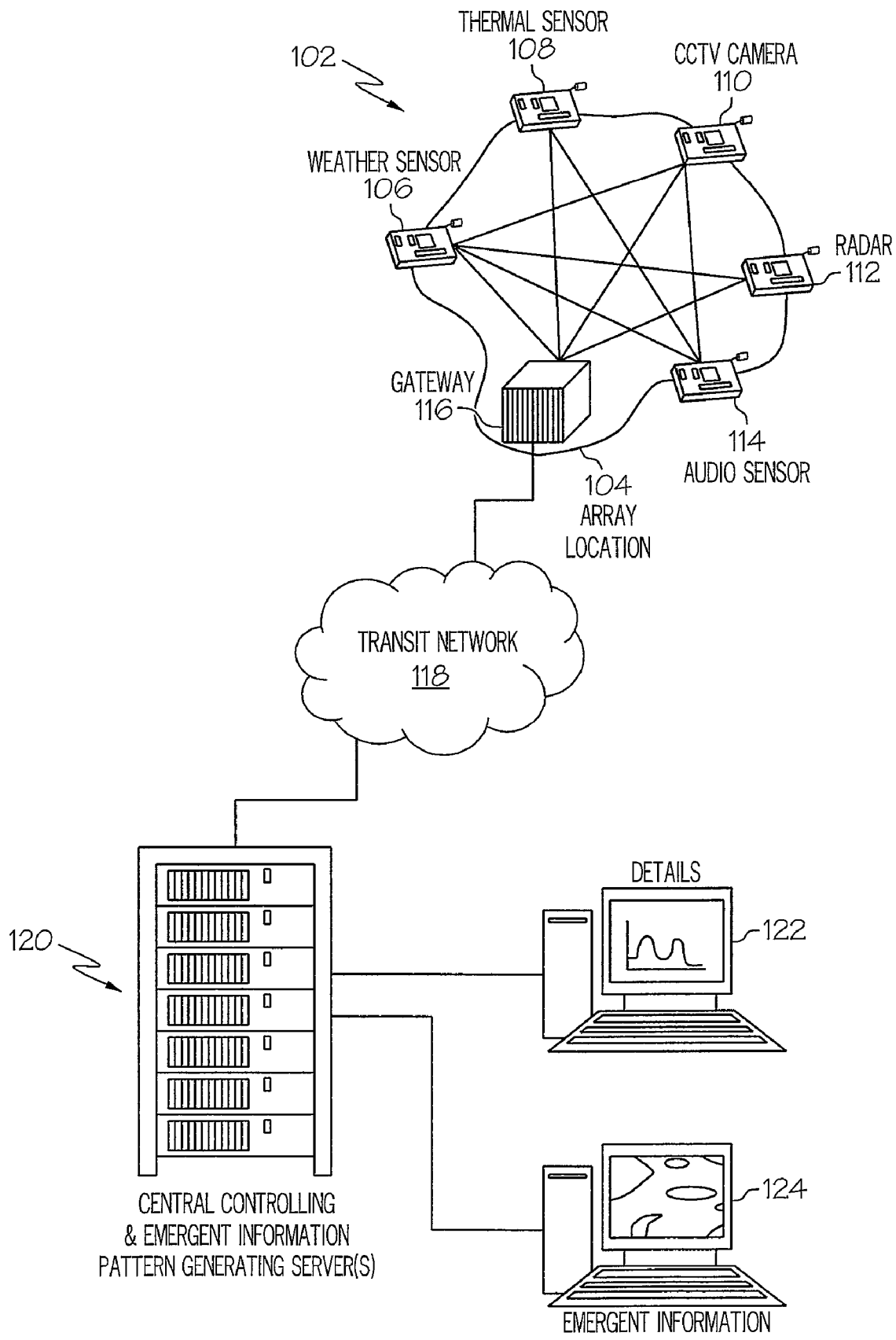
FIG. 1 depicts an exemplary array of sensors used to generate emergent information about a sensor field (sensor location)

Presently presented is a hardware, software and process system for using emergent information patterns to drive a sensor network. As described in detail below, a field of smart sensors is interactive. A controlling software, which describes a set of search patterns for the field of sensors, is pre-programmed or downloaded to the field of sensors. Each sensor "votes" as to whether it has detected an external stimulus that fits in any of the search patterns stored within the sensor. As the "vote" tally reaches a high enough percentage of "opt-in's," against a time line per pattern, the sensor field takes turns trying to get the results of the vote and its supporting details, already constantly shared amongst the sensors using zigbee, out via various telecommunications channels. Once one sensor gets the message out, the process re-commences.

Multiple information patterns can be searched for at once, since the information patterns are all pre-downloaded, and all can be checked against all the time. These information patterns can be updated and changed, and new information patterns can be added by a local or remote controller.

Reports generated by the output of data from the field of sensors provides pattern details (describing the pattern of sensed data), supporting data (that supports the pattern details), emergent results (next-level information that becomes "apparent" only after the data is received from the field of sensors), and other deterministic realtime information (including diagnostic data regarding the health of each sensor and its lines of communication with other sensors and the controller).

The novel system described herein is extremely valuable when attempting to deal with deterministic realtime problems, including those resulting from circumstances that are more complex than those created by just a single sensor being set off. Furthermore the process and system described here are valuable to any situation where more than one sensor or type of sensor is needed to develop emergent information, or that information needed for a human to recognize a pattern that serves a useful purpose.

This new system also creates a low power consumption profile for each sensor, since each sensor does not have to report "no op" all the time (i.e., the present invention does not require each sensor to continuously report insignificant non-events). As described herein, each sensor in the field can take turns reporting emergent information for the whole field of sensors. This provides many network paths to get a report out when needed, since each individual sensor can be connected separately (e.g., through a zigbee-type network) for outbound purposes, and thus one sensor can report for all. This approach also provides for deterministic realtime pattern evaluation, as well as constant addition, deletion, and changes of information patterns to be analyzed by the field of sensors. Furthermore, some of the field sensors can be out and the overall field of sensors can still be successful due to built-in redundancy. In addition, with some patterns, a tentative "yes" vote can automatically occur when a pre-determined level of "hits" by sensors is reached (e.g., two-thirds of the sensors reporting against a pattern).

This system works by pre-establishing emergent information and its patterns, and then downloading those patterns into smart sensors fields that now analyze each sensor's external data capture to:

1) match against those patterns in deterministic realtime mode;
2) vote as to matches using inter-networking technologies within time lines per pattern;
3) signal out when a sufficient match is established;
4) monitor for sensor health;
5) accept constant downloads of adds, deletes and changes to search patterns; and
6) work in degraded conditions such as sensors out, overloaded communications, and interference.

With reference now to FIG. 1, an exemplary array of sensors 102 in an array location 104 (sensor field) is depicted. For exemplary purposes, assume that the array location 104 is a coastline, in which there is a high traffic of maritime smuggling. The array of sensors 102 is pre-programmed with logic to detect suspicious activity. For example, the weather sensor 106 may detect inclement weather (e.g., cloud cover at night to make marine vessel detection difficult); the thermal sensor 108 may detect a thermal image of a marine vessel (e.g., how many engines it has and how many people are on board); a Closed Circuit Television (CCTV) camera 110 can intelligent detect and slave to moving objects on the water; a radar 112 system can detect the speed and movement of larger marine vessels; and an audio sensor 114 (e.g., an underwater hydrophone, an air microphone, etc.) can detect and interpret certain sound patterns for suspicious marine vessels (e.g., high-speed "cigarette" boats favored by drug traffickers). Within each sensor in the array of sensors 102 are programmed trigger rules, relationship rules, and emergent information logic.

A trigger rule is a rule that describes what conditions must be met for a sensor to issue an event signal to the other sensors in the array of sensors 102. For example, weather sensor 106 may have a trigger rule that requires weather sensor 106 to issue an event signal whenever a local rain gauge, barometer and thermometer indicate rainy conditions. Similarly, thermal sensor 108 may have a trigger rule that requires thermal sensor 108 to issue an event signal if the heat signature of only one person is registered in a cigarette boat, whose presence was detected by radar 112. The presence of the cigarette boat was put onto the array of sensors 102 in response to a trigger rule (e.g., speed and path measured by CCTV camera 110 and/or radar 112) being fired in radar 112. Likewise, if audio sensor 114 recognizes an audio signature of a suspicious marine vessel (e.g., a cigarette boat), this causes the trigger rule in the audio sensor 114 to cause the release of an event signal from the audio sensor 114.

Relationship rules are rules that define how sensors should communicate among themselves, and which sensor should communicate with a remote controller, if necessary. As shown in FIG. 1, all sensors are interlocked, such that every sensor communicates with every other sensor in the array of sensors 102. However, in another embodiment, some sensors may communicate with only certain other sensors within the array of sensors 102, or some sensors may communicate with sensors in other sensor arrays (not shown).

The relationship rules also come into play if a consolidated event signal (based on a predetermined number of sensors in the array of sensors 102 firing off event signals) is to be transmitted, via a gateway 116 and a transmit network 118 (e.g., a local IP-based or similar network), to a remote controller 120.

Emergent information logic (either software or hardware) is also part of each sensor. That is, each sensor may be able to consolidate event triggers from all sensors in the array of sensors 102, in order to generate emergent information that describes conditions about the array location 104. Thus, in the example described above, each sensor may be able determine that, based on event triggers caused by stormy weather (signaled by weather sensor 106), an audio signature of a cigarette boat (from audio sensor 114), and fast movement of the cigarette boat from a known drug-offloading location (from radar 112), a drug smuggling operation is likely in effect. Response to this may be local (e.g., turning on floodlights (not shown) in the array location 104) or remote (e.g., notifying a local law enforcement agency of the event).

As noted above, in a preferred embodiment, generation of emergent information is performed by the sensors themselves, thus being faster and less prone to communication failures. However, in an alternate embodiment, event signals (responsive to trigger rules being met) may be sent to a central controlling and emergent information pattern generating server 120. This server 120 can display details of the event signals on a display 122, or a consolidation of the event signals can be displayed as emergent information on a display 124.

Figure 2:
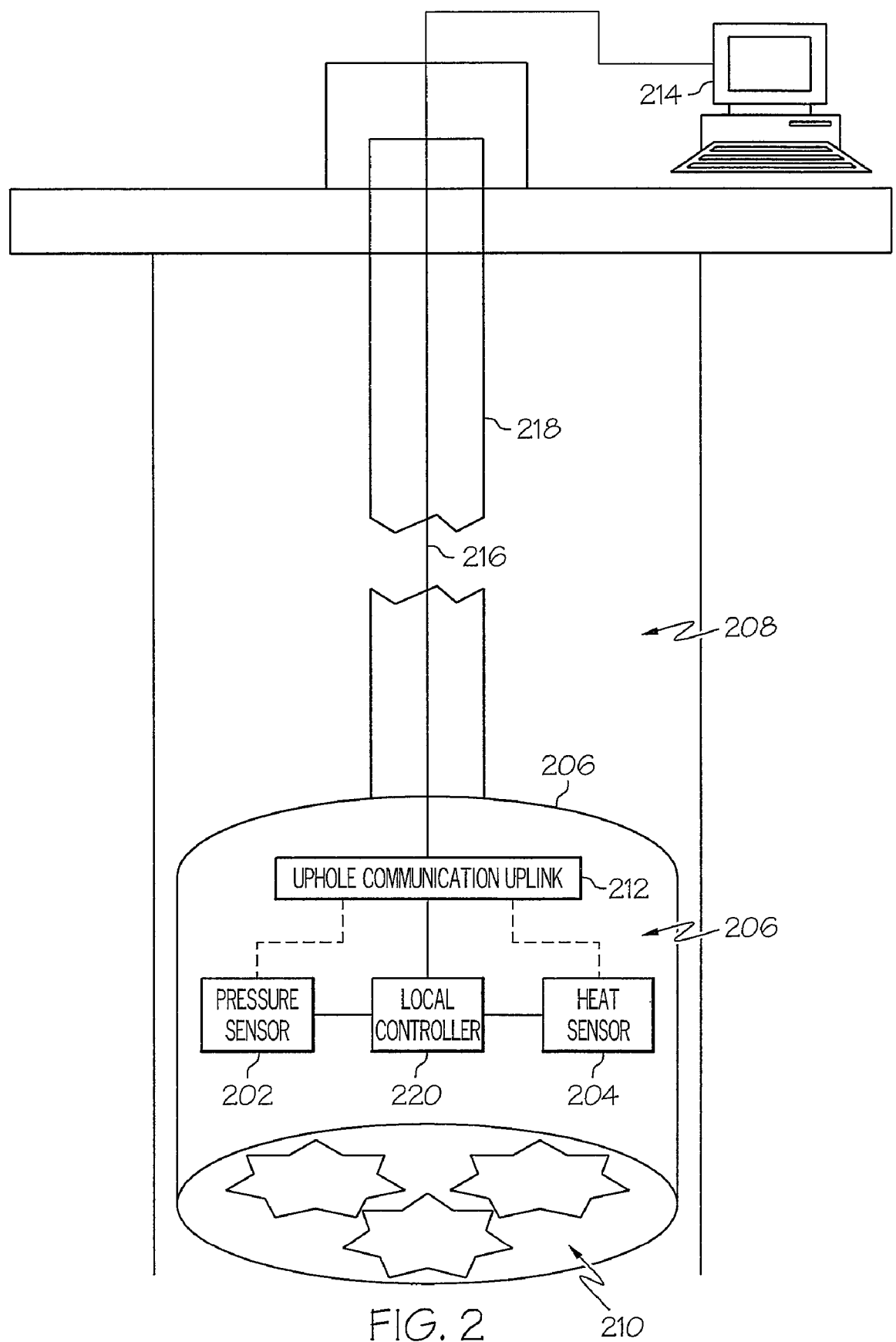
FIG. 2 illustrates a downhole implementation of the array of sensors.

Referring now to FIG. 2, another exemplary use of the present invention is presented. Assume now that the array of sensors comprises a pressure sensor 202 and a heat sensor 204 found in a downhole drill bit 206 that is drilling a well 208 (not to scale). As teeth 210 cut through different soils and rock, they can be damaged. For example, assume that teeth 210 are initially cutting through sand, but then hit hard rock. To prevent damage to teeth 210, drill bit 206 needs to immediately slow down, if not back away from the rock. If this pressure and heat information from pressure sensor 202 and heat sensor 210 were sent via an uphole communication uplink to a computer 214, the time required to traverse the communication cable 216 inside the drill string 218 may be too long to avoid damage to the drill bit 206. Therefore, a local controller 220 causes the drill bit 206 to immediately alter operations (assuming that drill bit utilizes a locally controlled motor—not shown), thus preventing damage to the teeth 210 and the rest of the drill bit and motor. In a preferred embodiment, local controller 220 is not a different component, but is actually a compilation of rule and event logic (such as that described above in FIG. 1) that is part of pressure sensor 202 and heat sensor 204.

Note that in one embodiment, computer 214 acts as a remote controller that is capable of updating the trigger rules and communication rules found in the sensors. That is, although pressure sensor 202 and heat sensor 204 comprise their own trigger rules (for triggering event signals) and relationship rules (for intra and extra-communication) to create the emergent information needed to stop the drilling operation, these rules may be downloaded and/or upgraded by computer 214.

Figure 3A:
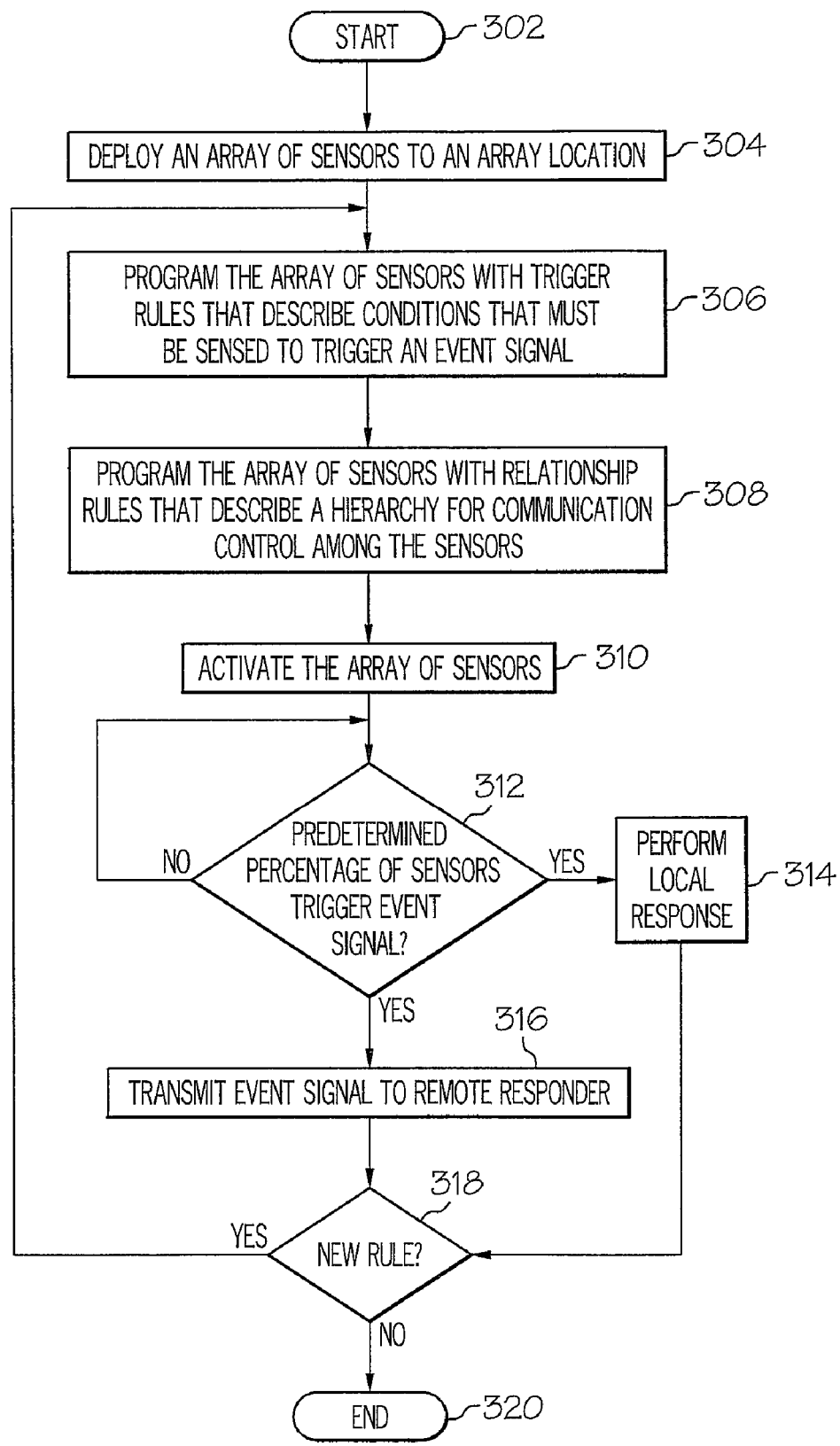
FIG. 3A is a flow-chart of exemplary steps taken to utilize emergent information that is created by an array of sensors.
Figure 3B:
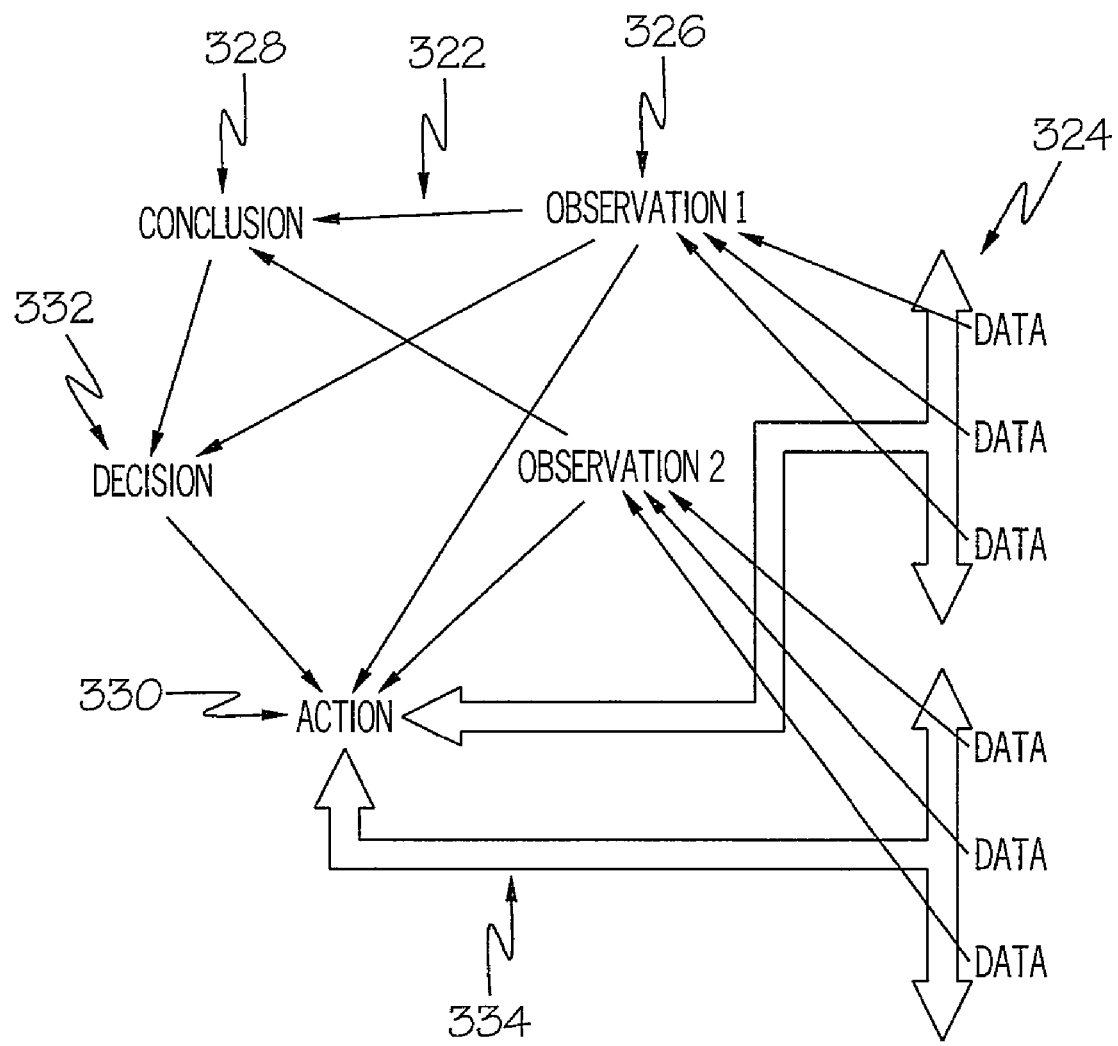
FIG. 3B depicts a difference between process patterns and data patterns.

With reference now to FIG. 3, a flow-chart of exemplary steps taken to utilize emergent information from a sensor field is presented. After initiator block 302, which may be prompted by a project to monitor field conditions, an array of sensors is deployed to an array location in the field (block 304). These sensors are programmed (either before or after deployment) with trigger rules (block 306) and relationship rules (block 308), which are described above. These rules may be pre-programmed before the sensors are deployed to the field, or they may be programmed by a remote controller as described above.

After the array of sensors are activated (block 310), a query is made to determine if a predetermined percentage of the sensors have triggered an event signal (query block 312). If so, this creates emergent information that describes an overall picture of conditions at the array location. Preferably, the array of sensors use their consolidated logic to perform a local response (block 314), which addresses/corrects the perceived conditions at the array location. Note that in one embodiment, this local response is to turn a sensor on. Thus, to conserve battery life, a particular sensor may be turned on only if another sensor detects a condition in which the particular sensor is needed. In the example described above for drug interdiction (FIG. 1), the CCTV camera 110 may be on "stand by" until radar 112 detects suspicious movement, thus saving power consumption by CCTV camera 110.

Alternatively, the consolidated response (emergent information) is sent to a remote responder (e.g., local law enforcement described in FIG. 1), as described in block 316. If a determination is made that a trigger rule or a relationship rule for one or more of the sensors needs to be updated (query block 318), this action is performed by the remote controller (or alternatively, by one of the sensors). The process ends at terminator block 320.

Note that the present invention utilizes a data pattern approach, rather than a process pattern approach. That is, FIG. 3B demonstrates the process pattern approach (exemplified by thin lines 322) as the approach of collecting data 324, which leads to one or more observations 326, which leads to conclusions 328 and/or actions 330 that are controlled by a decision maker 332. The present invention bypasses most of these steps by allowing data 324, which conforms to a known pattern, to automatically lead directly to an action 330, as represented by a data pattern approach that is depicted by the thicker lines 334.

Figure 4:
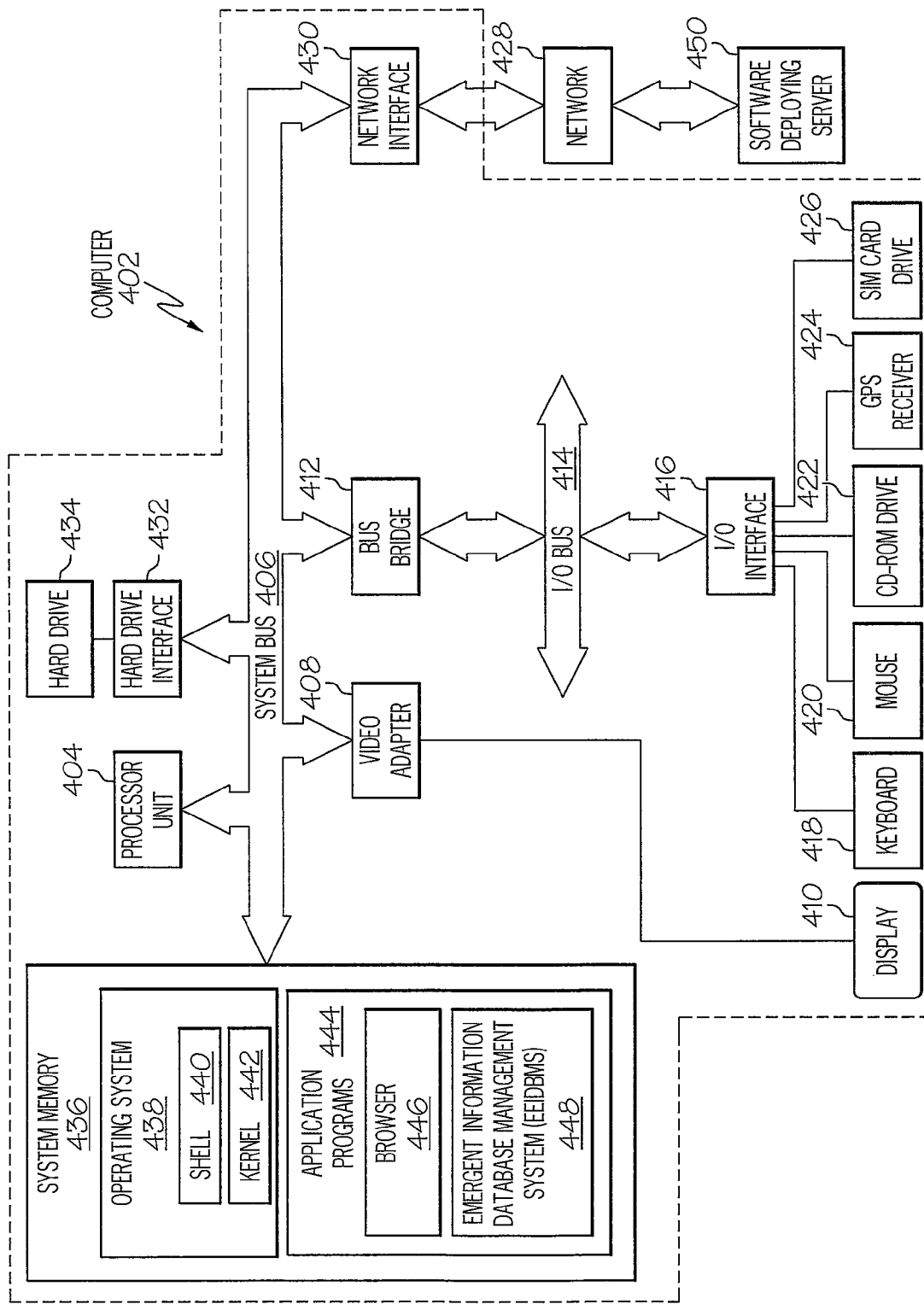
FIG. 4 illustrates an exemplary computer in which the present invention may be utilized.

With reference now to FIG. 4, there is depicted a block diagram of an exemplary computer 402, in which the present invention may be utilized. Note that some or all of the exemplary architecture shown for computer 402 may be utilized by software deploying server 450, as well as server 120 and elements 106-116 shown in FIG. 1.

Computer 402 includes a processor unit 404 that is coupled to a system bus 406. A video adapter 408, which drives/supports a display 410, is also coupled to system bus 406. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk-Read Only Memory (CD-ROM) drive 422, a GPS receiver 424 (e.g., GPS receiver 206 shown in FIG. 2), and a SIM card drive 426 (e.g., SIM card program 106 and/or SIM card reader 126 shown in FIG. 1). The format of the ports connected to I/O interface 416 may be any known to those skilled in the art of computer architecture, including but not limited to Universal Serial Bus (USB) ports.

Computer 402 is able to communicate with a software deploying server 450 via a network 428 using a network interface 430, which is coupled to system bus 406. Network 428 may be an external network such as the Internet or transit network 118 shown in FIG. 1, or an internal network such as an Ethernet or a Virtual Private Network (VPN).

A hard drive interface 432 is also coupled to system bus 406. Hard drive interface 432 interfaces with a hard drive 434. In a preferred embodiment, hard drive 434 populates a system memory 436, which is also coupled to system bus 406. System memory is defined as a lowest level of volatile memory in computer 402. This volatile memory includes additional higher levels of volatile memory (not shown), including, but not limited to, cache memory, registers and buffers. Data that populates system memory 436 includes computer 402's operating system (OS) 438 and application programs 444.

OS 438 includes a shell 440, for providing transparent user access to resources such as application programs 444. Generally, shell 440 is a program that provides an interpreter and an interface between the user and the operating system. More specifically, shell 440 executes commands that are entered into a command line user interface or from a file. Thus, shell 440 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 442) for processing. Note that while shell 440 is a text-based, line-oriented user interface, the present invention will equally well support other user interface modes, such as graphical, voice, gestural, etc.

As depicted, OS 438 also includes kernel 442, which includes lower levels of functionality for OS 438, including providing essential services required by other parts of OS 438 and application programs 444, including memory management, process and task management, disk management, and mouse and keyboard management.

Application programs 444 include a browser 446. Browser 446 includes program modules and instructions enabling a World Wide Web (WWW) client (i.e., computer 402) to send and receive network messages to the Internet using Hyper-Text Transfer Protocol (HTTP) messaging, thus enabling communication with software deploying server 450 and other described computer systems.

Application programs 444 in computer 402's system memory (as well as software deploying server 450's system memory) also include a Emergent Information Database Management System (EIDBMS) 448. EIDBMS 448 includes code for implementing the processes described in FIGS. 1-3 and 7. In one embodiment, computer 402 is able to download EIDBMS 448 from software deploying server 450.

The hardware elements depicted in computer 402 are not intended to be exhaustive, but rather are representative to highlight essential components required by the present invention. For instance, computer 402 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 450 performs all of the functions associated with the present invention (including execution of EIDBMS 448), thus freeing computer 402 from having to use its own internal computing resources to execute EIDBMS 448.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of EIDBMS 448, are performed by service provider server 450. Alternatively, EIDBMS 448 and the method described herein, and in particular as shown and described in FIGS. 1-3 and 7, can be deployed as a process software from service provider server 450 to computer 402. Still more particularly, process software for the method so described may be deployed to service provider server 450 by another service provider server (not shown).

Figure 5A:
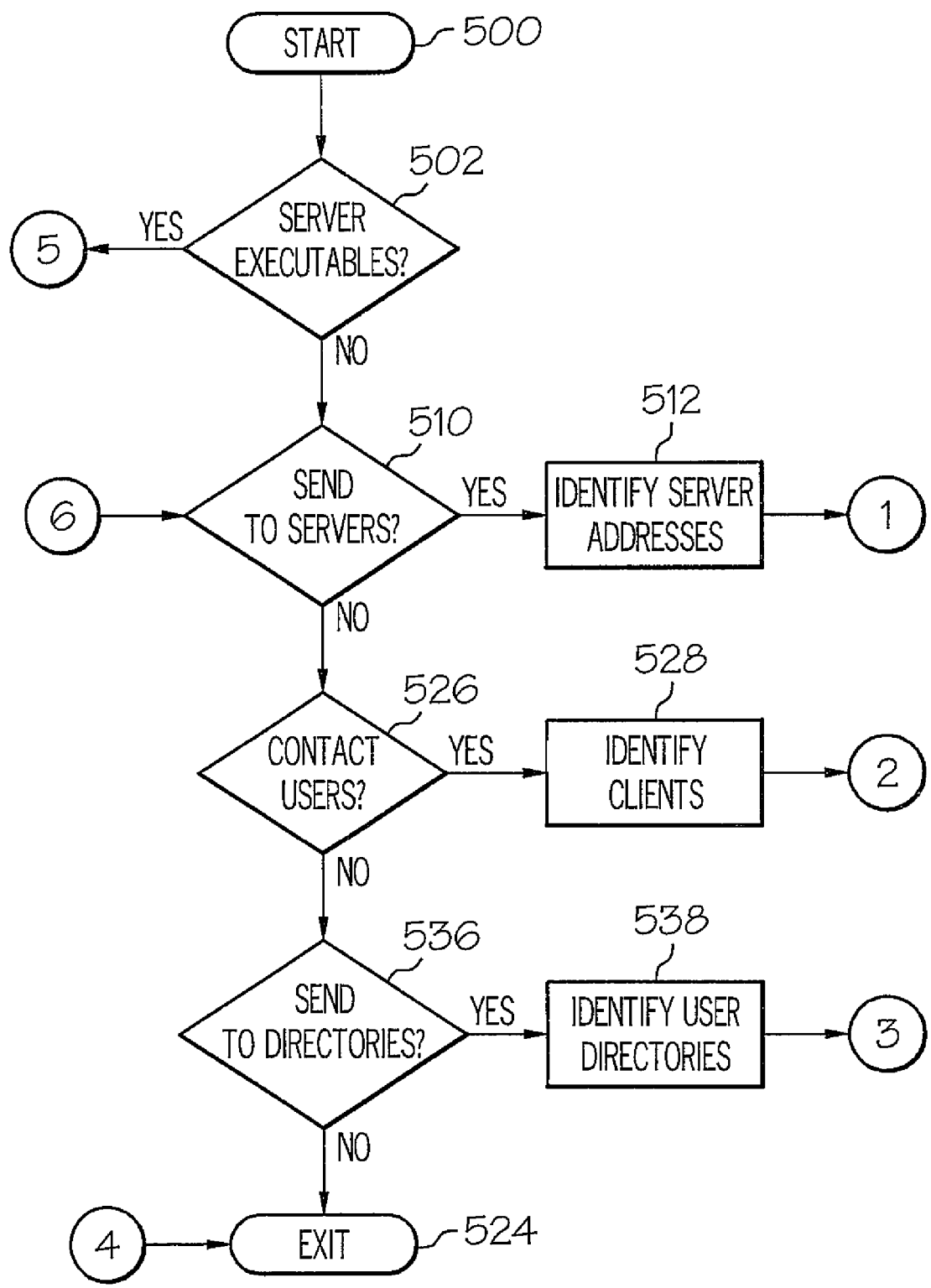
FIGS. 5A-B are flow-charts showing steps taken to deploy software capable of executing the steps described in FIGS. 1-3 and 7-22.
Figure 5B:
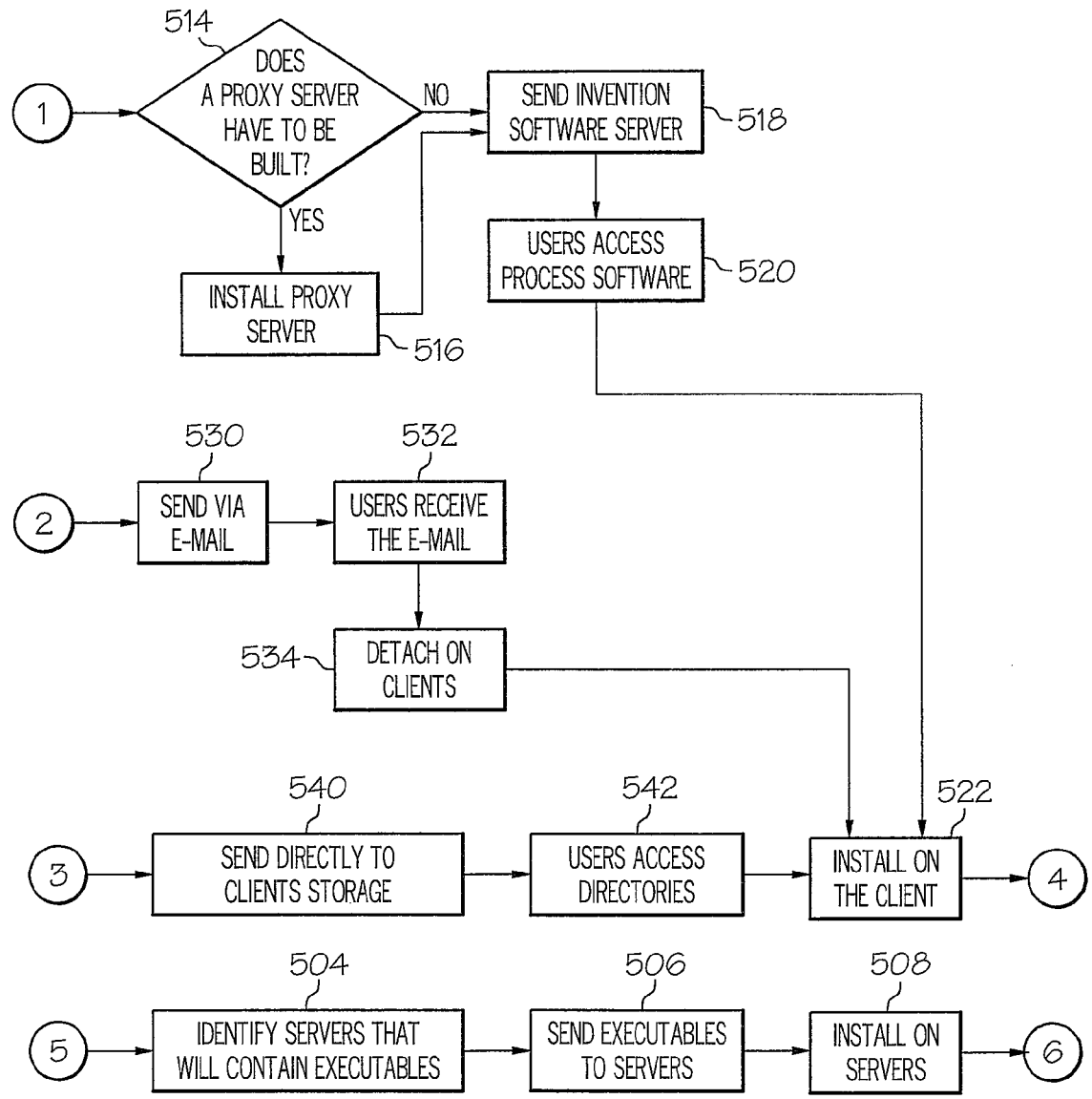

Referring then to FIGS. 5A-B, step 500 begins the deployment of the process software. The first thing is to determine if there are any programs that will reside on a server or servers when the process software is executed (query block 502). If this is the case, then the servers that will contain the executables are identified (block 504). The process software for the server or servers is transferred directly to the servers' storage via File Transfer Protocol (FTP) or some other protocol or by copying though the use of a shared file system (block 506). The process software is then installed on the servers (block 508).

Next, a determination is made as to whether the process software is to be deployed by having users access the process software on a server or servers (query block 510). If the users are to access the process software on servers, then the server addresses that will store the process software are identified (block 512).

A determination is made if a proxy server is to be built (query block 514) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 516). The process software is sent to the servers either via a protocol such as FTP or it is copied directly from the source files to the server files via file sharing (block 518). Another embodiment would be to send a transaction to the servers that contained the process software and have the server process the transaction, then receive and copy the process software to the server's file system. Once the process software is stored at the servers, the users, via their computers, then access the process software on the servers and copy to their computers' file systems (block 520). Another embodiment is to have the servers automatically copy the process software to each client and then run the installation program for the process software at each computer. The user executes the program that installs the process software on his computer (block 522) then exits the process (terminator block 524).

In query step 526, a determination is made whether the process software is to be deployed by sending the process software to users via e-mail. The set of users where the process software will be deployed are identified together with the addresses of the user computers (block 528). The process software is sent via e-mail to each of the users' computers (block 530). The users then receive the e-mail (block 532) and then detach the process software from the e-mail to a directory on their computers (block 534). The user executes the program that installs the process software on his computer (block 522) then exits the process (terminator block 524).

Lastly a determination is made as to whether the process software will be sent directly to user directories on their computers (query block 536). If so, the user directories are identified (block 538). The process software is transferred directly to the user's computer directory (block 540). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 542). The user executes the program that installs the process software on his computer (block 522) and then exits the process (terminator block 524).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers, including the network operating system where the process software will be deployed, that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units describe an example that represents but one measurement of use. Other measurements of use include but are not limited to network bandwidth, memory utilization, storage utilization, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory utilization, storage utilization, etc. approach a capacity so as to affect performance, additional network bandwidth, memory utilization, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 6A:
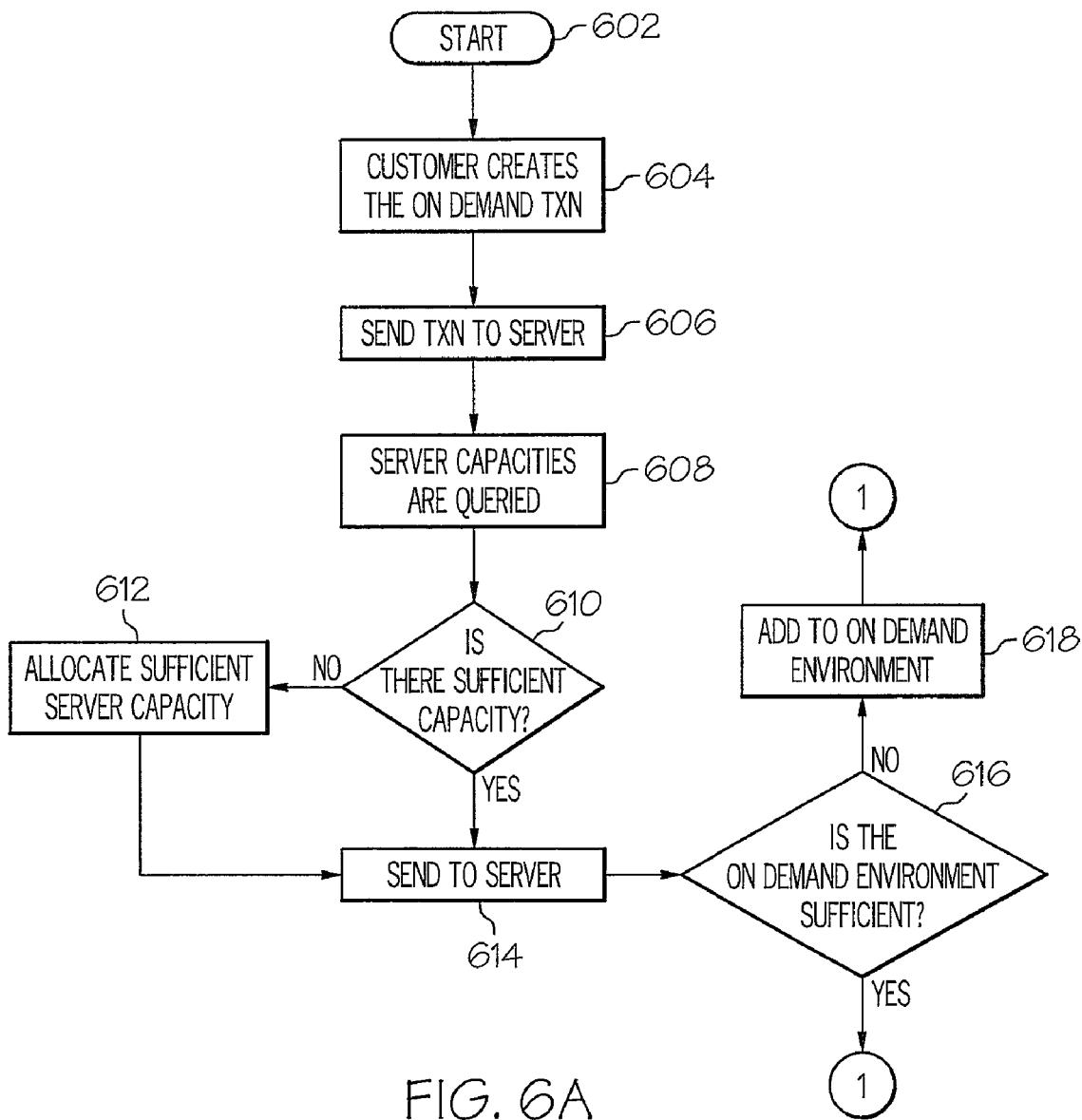
FIGS. 6A-B are flow-charts showing steps taken to execute the steps shown in FIGS. 1-3 and 7-22 using an on-demand service provider.
Figure 6B:
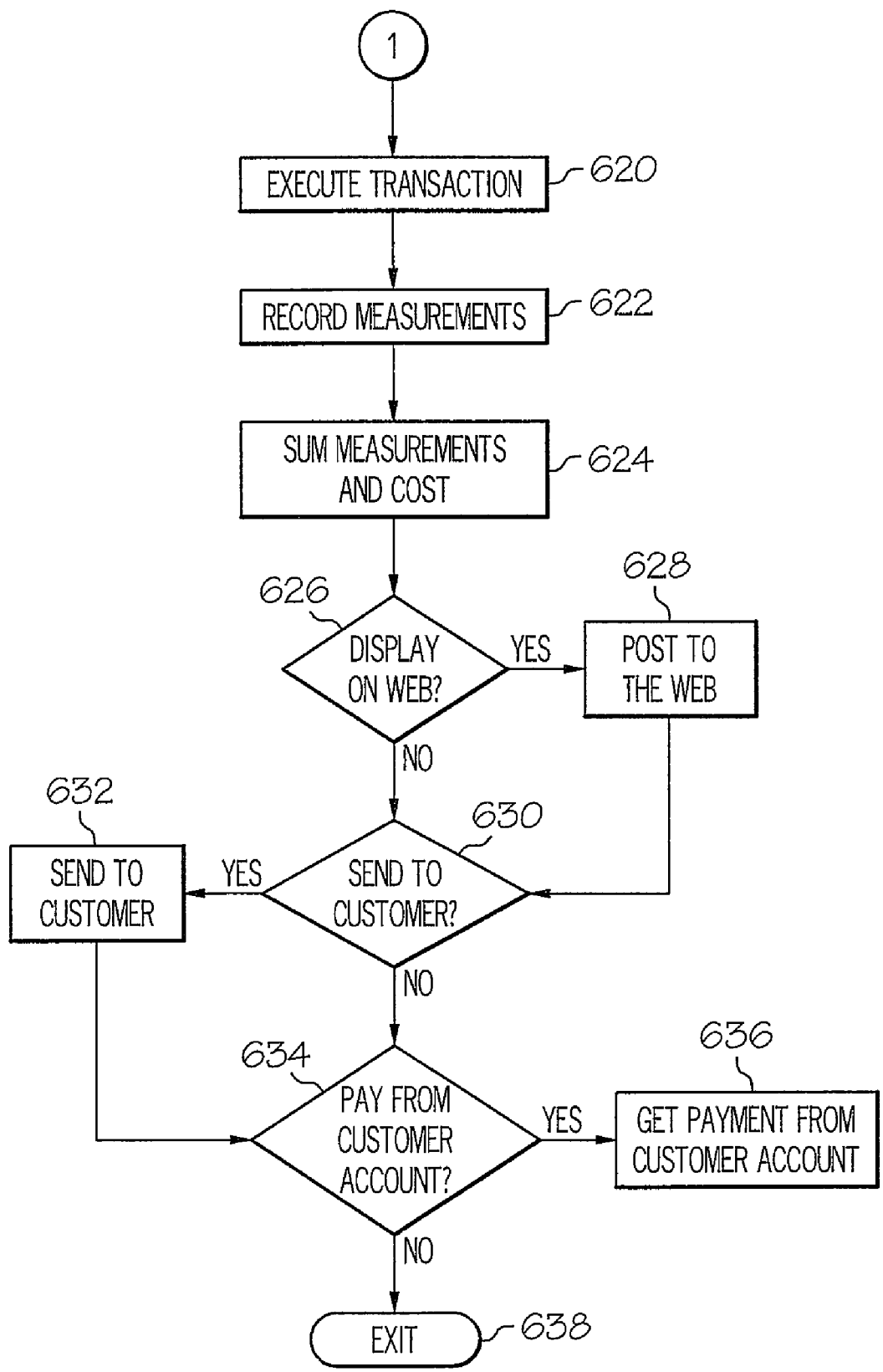

With reference now to FIGS. 6a-b, initiator block 602 begins the On Demand process. A transaction is created than contains the unique customer identification, the requested service type and any service parameters that further specify the type of service (block 604). The transaction is then sent to the main server (block 606). In an On Demand environment the main server can initially be the only server, then as capacity is consumed other servers are added to the On Demand environment.

The server central processing unit (CPU) capacities in the On Demand environment are queried (block 608). The CPU requirement of the transaction is estimated, then the server's available CPU capacity in the On Demand environment are compared to the transaction CPU requirement to see if there is sufficient CPU available capacity in any server to process the transaction (query block 610). If there is not sufficient server CPU available capacity, then additional server CPU capacity is allocated to process the transaction (block 612). If there was already sufficient available CPU capacity then the transaction is sent to a selected server (block 614).

Before executing the transaction, a check is made of the remaining On Demand environment to determine if the environment has sufficient available capacity for processing the transaction. This environment capacity consists of such things as but not limited to network bandwidth, processor memory, storage etc. (block 616). If there is not sufficient available capacity, then capacity will be added to the On Demand environment (block 618). Next the required software to process the transaction is accessed, loaded into memory, then the transaction is executed (block 620).

The usage measurements are recorded (block 622). The utilization measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 624).

If the customer has requested that the On Demand costs be posted to a web site (query block 626), then they are posted (block 628). If the customer has requested that the On Demand costs be sent via e-mail to a customer address (query block 630), then these costs are sent to the customer (block 632). If the customer has requested that the On Demand costs be paid directly from a customer account (query block 634), then payment is received directly from the customer account (block 636). The On Demand process is then exited at terminator block 638.

Emergent Information Database Management

A traditional database management system simply stores data. That is, data stored within such a system is without context, timing, and relevance. Even combinations of data lack context, relevance, and timing. Thus, to manage emergent information such as that described above, a unique system is used to collect, store, and manage emergent information which has context, relevance, usefulness, and has a time and place context. Such emergent information is stored and maintained in a unique Emergent Information Database Management System (EIDBMS). Note again that emergent information is based on a definition and storage of patterns of data which, when combined, collectively provide the user, either automated or human, with information which is not obvious until the combination or combinations of the data are considered in their entirety.

Note that while an EIDBMS is particularly useful when used with an array of sensors such as described above, an EIDBMS is also useful for interpreting existing databases. That is, while the EIDBMS can be utilized, in a manner described below, to create trigger rules, communication rules and consolidated logic for sensors as described above, the EIDBMS can also be used to create emergent information for an existing database.

As describe below, an EIDBMS changes the concept of information management from collecting, managing, and subsequently dealing with vast amounts of data, to collecting and managing information of relevance (leading to emergent information). Thus, emergent information is a combination of data which, when viewed by a human or intelligent software, conveys knowledge or insight that can only be ascertained when all, or in certain cases at least significant parts of the data comprising the emergent information, are viewed with each other and in the context of each other. Net "new" information is the result of viewing this combination. Thus, in the drug interdiction example shown above in FIG. 1, it is likely that one would not recognize that a drug smuggling operation is taking place by viewing data from only one of the sensors. However, by viewing data from multiple different types of sensors, the user is able to recognize that such an operation is likely, based on the pattern recognized by consolidating the event signals that have been triggered from multiple sensors.

Thus, emergent information is represented in the EIDBMS by patterns of data, either singular, or in certain combinations. A pattern, typically with one to several levels of data combined into a composite "map" or layout of the data, yields, when at least partially filled under specified conditions and rules, a recognition moment in which new information has been recognized, or "generated" by the pattern. Thus, emergent information is somewhat analogous to the physiology of human memory, in which groupings of protein memory bits stored in dendrites combine to representing memories according to these pattern combinations. An approximate computing analog to the brain pattern storage system is used in this inventive EIDBMS to achieve the same result.

Another analogy to the principals captured by the EIDBMS described herein is "wisdom," which is based on understanding principles. Principles represent the accumulation of patterns, typically in the case of this EIDBMS pattern of patterns that continue, when analyzed, to yield the same or semantically similar results over time. The inventive EIDBMS disclosed herein provides for the storage, continuous evaluation, and prioritization and self-ranking of stored patterns which could lead to eventual conclusions about the "wisdom" or accuracy of these patterns of patterns.

Thus the EIDBMS system provides for the federated, multi-dimensional, asynchronous, evaluated, autonomic, rules-driven, and managed storage of patterns of data that are either pre-defined, ad-hoc or self-generated.

The principals described here for creating and recreating emergent information may be applied to searching for intelligent life on other planets, diagnosing medical diseases, recognizing drug interactions, optimizing manufacturing processes, defining and correcting environmental issues, including global warming, establishing business and credit ratings and scores, etc. All scenarios include the use of self-generating patterns, which are created by a pattern of rules that create a new pattern when that pattern is invoked.

Figure 7:
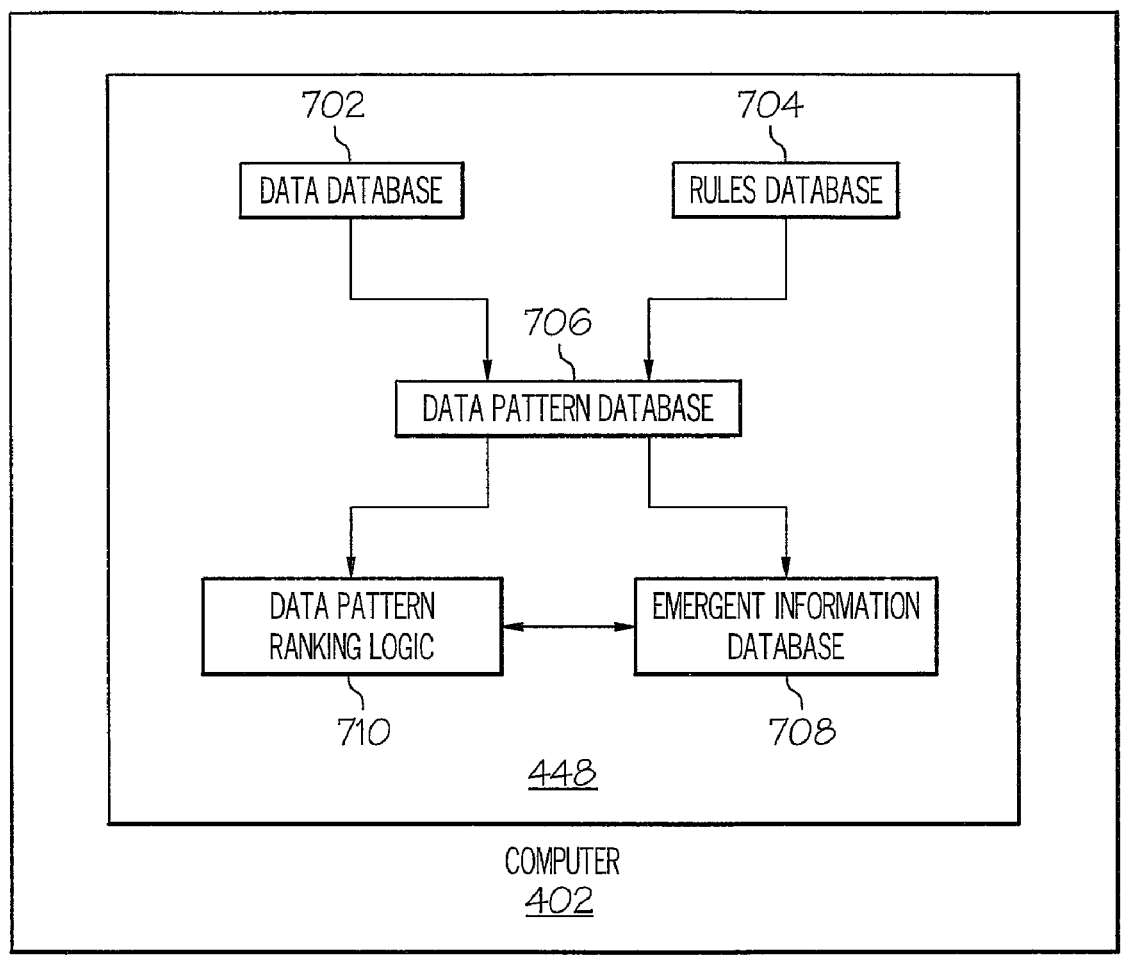
FIG. 7 depicts an exemplary Emergent Information Database Management System (EIDBMS) used to manage emergent data.

Referring now to FIG. 7, details of an Emergent Information Database Management System (EIDBMS) 448 are presented. EIDBMS 448 is part of a computer 402, described above in FIG. 4. EIDBMS 448 includes a data database 702 and a rules database 704. Rules from rules database 704 are applied to data in database 702 to generate data patterns that are stored in data pattern database 706. For example, assume that there is a rule that states that whenever a radar system detects a marine vessel traveling from a specific location within a certain speed range, then underwater hydrophones must be turned on. These rules cause a consolidation of data from the radar system and the hydrophones to show a pattern of information whenever such a marine vessel is in the area of the sensors. The data patterns in the data pattern database 706 are then consolidated to create emergent information, which is stored in emergent information database 708. Thus, the data pattern from the radar and hydrophones generate emergent information such as "This is a smuggler." A data pattern ranking logic 710 is able to determine, based on historical information, which data patterns best describe (or predict) a particular emergent information. For example, assume that a smuggler is actually detected and/or caught 90% of the time that the radar and hydrophones turn on as described above, but a ship is found to be in distress only 50% of the time that the radar and hydrophones are turned on. In that scenario, if the radar and hydrophones are turned on and reporting data in the future, then it is more likely that there is smuggling activity occurring, rather than an innocent boat being in distress. Based on this historical data and ranking of data patterns, future incoming data can be quickly analyzed using such emergent information.

Figure 8:
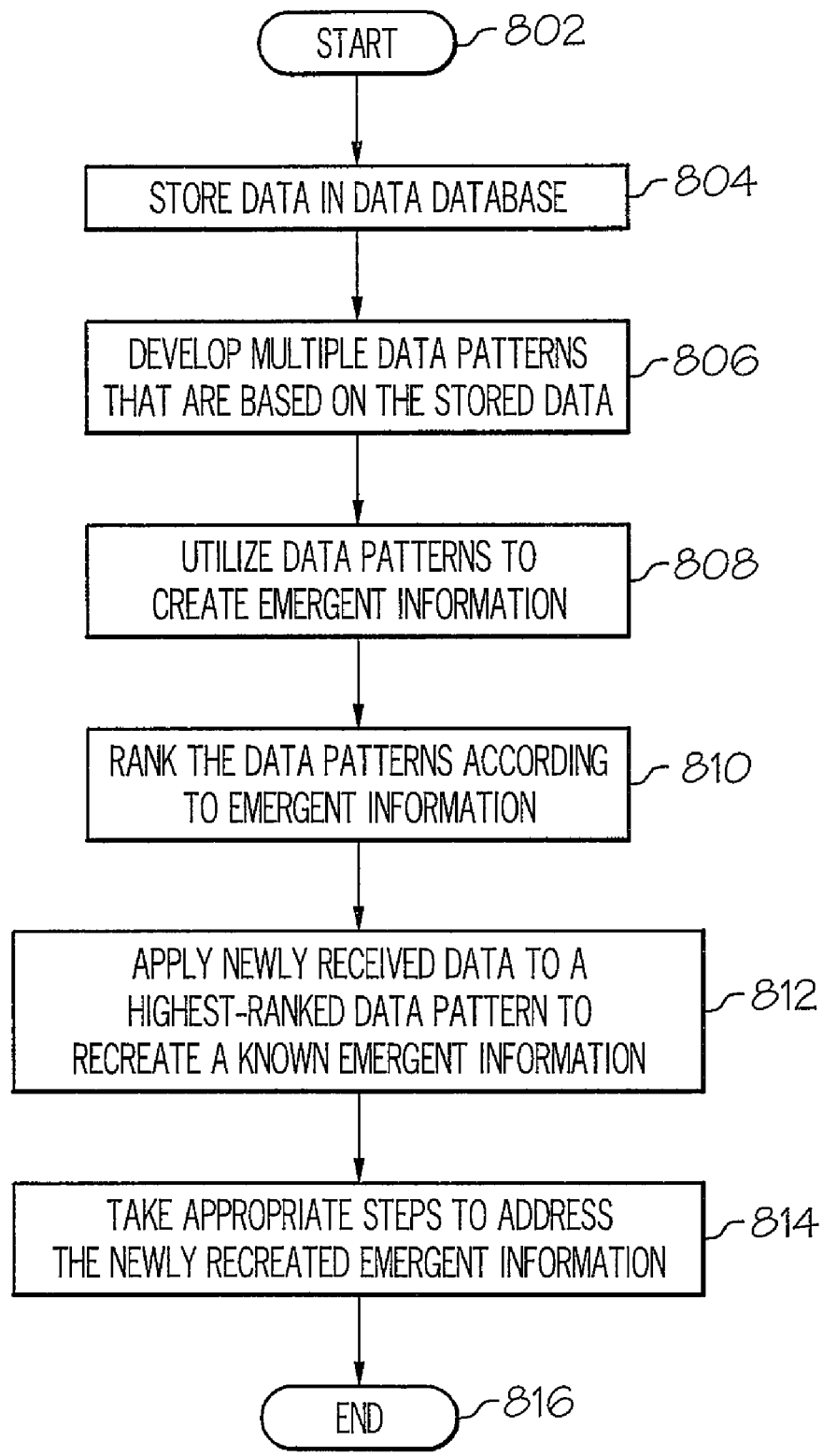
FIG. 8 is a flow-chart of exemplary steps taken to recreate known emergent information.

Thus, as shown in the flow chart of FIG. 8, assume that a new EIDBMS is being created (initiator block 802). Data (e.g., from sensors or even another database) are stored in a data database (block 804). From this stored data, multiple data patterns are then stored in a data pattern database (block 806). These data patterns are then used to create emergent information (block 808), e.g., determining that smuggling is occurring based on data received from specific sensors. Various data patterns are then ranked according to how accurately they indicate (or predict) an emergent information (block 810). Thereafter, when new data is received that matches a known data pattern, that data pattern is ranked in accordance with a known emergent information (block 812). That is, assume that data comes in from a radar and hydrophone of a that has a particular value (i.e., "specific data") for the two sensors (i.e., "specific data types"). In the example above (for smuggling and distress), the "smuggling" emergent information is more likely to be matched with the incoming data, and thus this data pattern is highest ranked as being the most likely correct pattern for recreating the known emergent information ("smuggling"). At that point, appropriate steps can be taken to apprehend the smugglers (block 814), such as notifying local law enforcement officials. The process ends at terminator block 816.

In one embodiment, the EIDBMS 448 shown in FIG. 7 can be built using the "blob" feature of DB2, and other software, along with newly defined schemas described herein. The Create Read Update Delete (CRUD) operations related to data patterns and emergent information can be provided as a service in a Service Oriented Architecture (SOA) as per the previously described pattern-driven sensor networks. Commercially available rules engines can be both outside and/or inside the new EIDBMS.

There are multiple advantages of the presently disclosed EIDBMS over the prior art. That is, prior art information systems (e.g., standard relational databases) are already generating more "information" than can be reasonably consumed by humans and traditional data processing systems, and this "glut" will only accelerate. For this "information" to be useful, timely and relevant, a fundamental change in how data and information is captured and analyzed is required. The EIDBMS addresses these and other issues by eliminating, or substantially reducing, the capture of "dead air" or irrelevant data, by the autonomous detection and storage of emergent information or information of real value, by providing a huge advance in the speed of realizing the appearance and relevance of emergent information, and by enabling the substantial advance of the ability of systems to run autonomously.

Intelligence-driven ICON's and Cursors

Raw data may be presented in many formats, including tables, charts, maps, etc. Maps or other "layout" techniques, with objects or "targets," are useful for locating one to a few objects, for classifying objects by time, place, and location, and for displaying object associated additional information. However, when a user is confronted with hundreds or thousands of objects, the vast percentage of them are just "clutter" that hides the true, few objects that require immediate action. Such clutter is not only useless, but may even be dangerous if misinterpreted. Thus, a user response to such required action becomes impossible. For example, consider a user who is confronted with thousands of marine vessels on a map (with limited interdiction resources), or thousands of possible high speed drug development molecules (with limited syntheses resources), or thousands of possible retail customers (with limited sales staff and time). Such information overload is the subject of much consternation and concern. Operators faced with too much information are as blind as those who have little or no information.

Additionally, information which has been manipulated to become emergent information, as described in the processes above, would be useful if displayed in a manner that shows the context, relationship, repercussions, and/or relevance for the emergent information. Thus, the present invention "de-clutters" cluttered information, and quickly consolidates significant amounts of emergent information into a novel and useful display.

Figure 9:
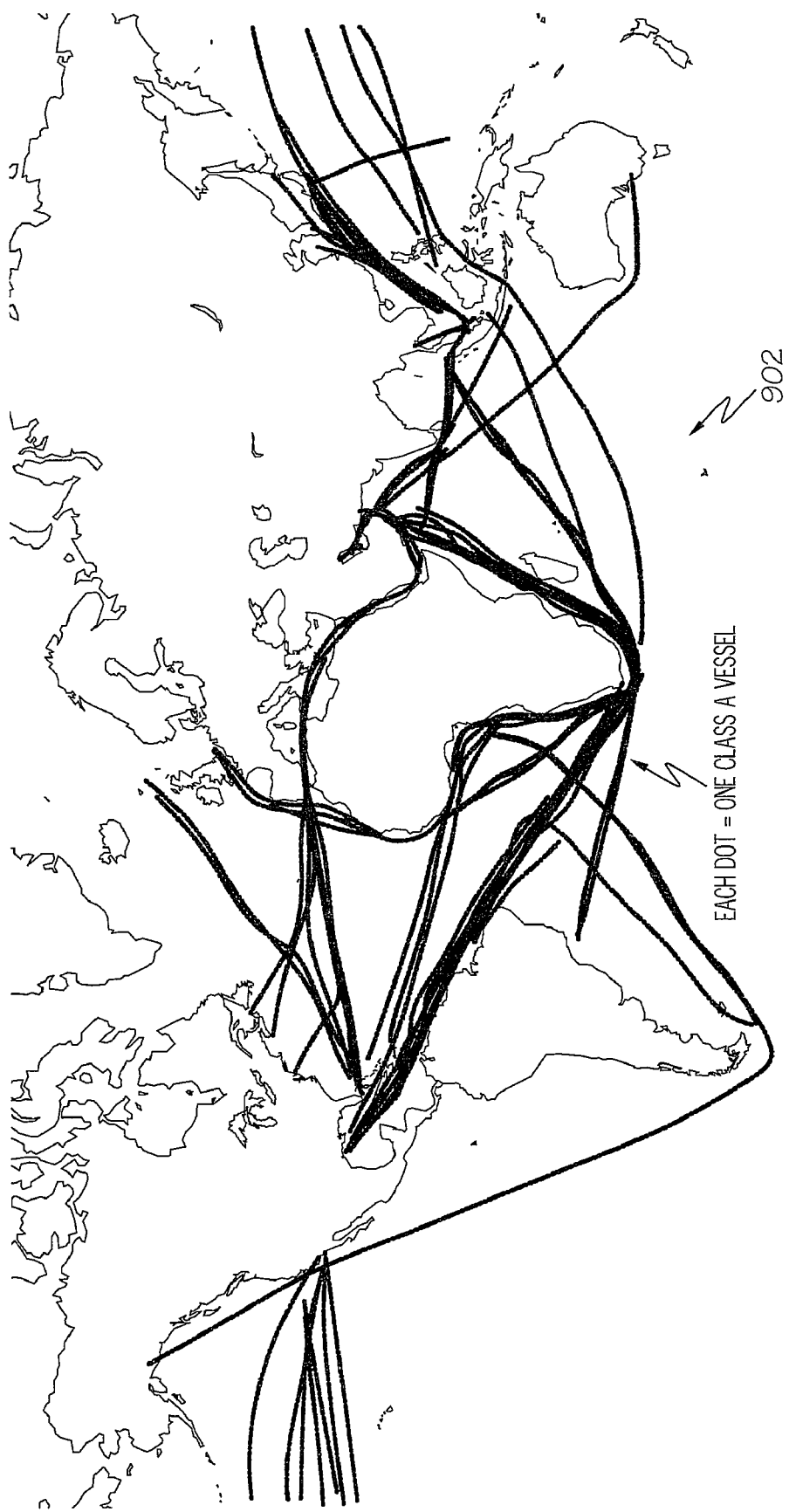
FIG. 9 is a map of marine traffic.

With reference now to FIG. 9, a map 902 shows a dot at a real-time location of every Class A (over 300 tons displacement) vessel on the world's waterways. Since there are approximately 70,000 Class A vessels in the world, the dots become blurred into indecipherable lines. That is, each dot can provide little or no useful information, even if each dot were graphically coded to represent some type of useful information. Thus, the vast abundance of data points makes any type of analysis impossible. Such analysis would be particularly valuable in efforts to thwart malicious activity by marine vessels, such as the drug smuggling operation described above in FIG. 1, or in combating a water-launched terrorist attack.

Figure 10:
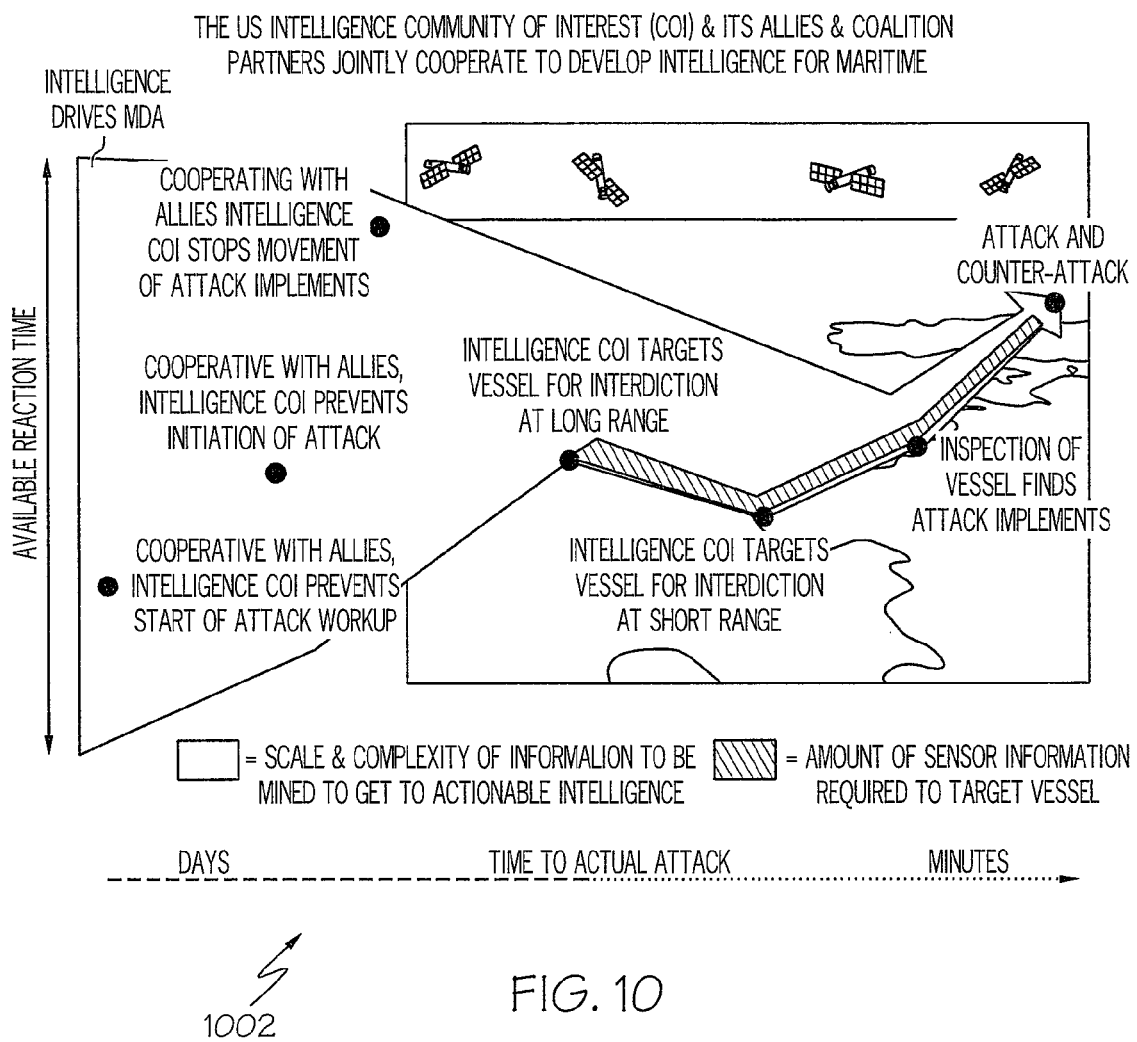
FIG. 10 is a time-chart for interdiction activity.

For example, consider the time line chart 1002 depicted in FIG. 10. Different attack activities are graphed in generic terms months, weeks, or even days before an attack (i.e., as shown to the left portion of the "Time To Actual Attack"). While data mining may be feasible if given enough time (e.g., days or weeks before the attack), an imminent attack requires real-time information that is clear and addressable. Emergent information, and particularly clearly graphed emergent information as now described, provides this type of real-time information.

Figure 11:
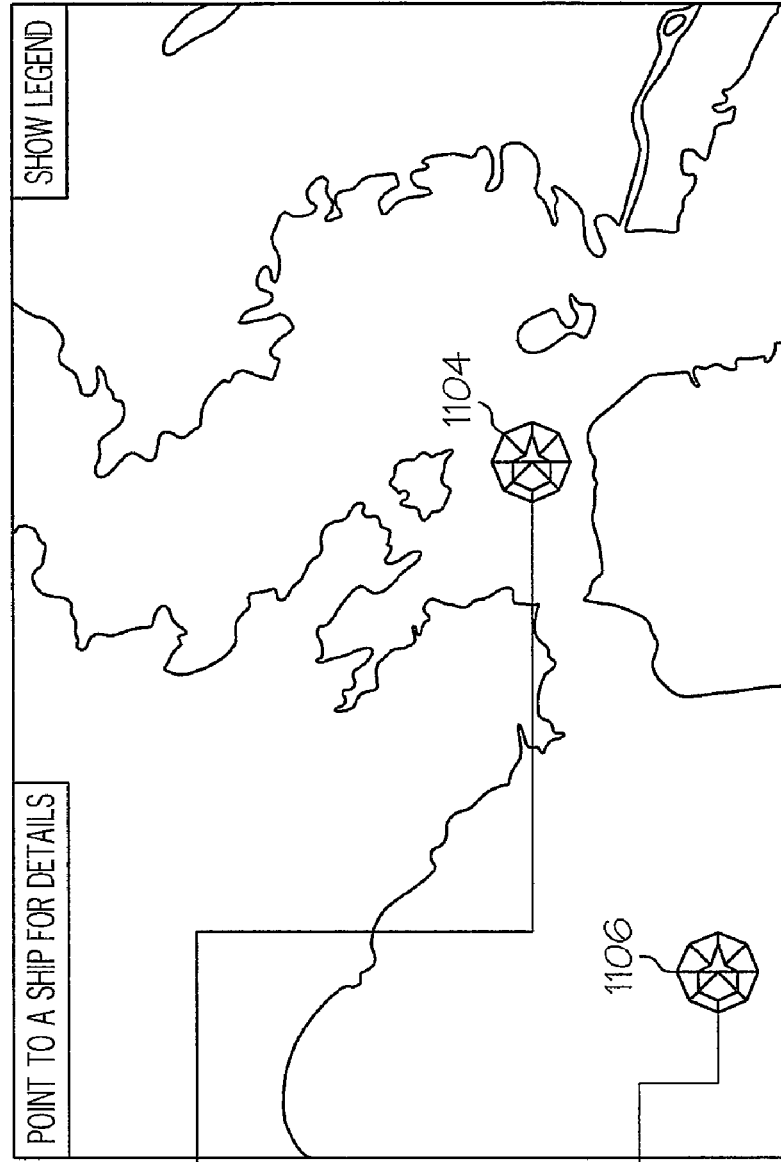
FIG. 11 is a map of friendly and hostile marine vessels that are represented by intelligent icons.

With reference now to FIG. 11, a graph 1102 shows two marine vessels: a friendly marine vessel represented by a first emergent information icon 1104, and a hostile marine vessel represented by a second emergent information icon 1106. These icons (1104 and 1106) are described in the context of graph 1102 as "Push" icons, since they are "pushing" data to a user, in a manner described in more detail below.

Figure 12:
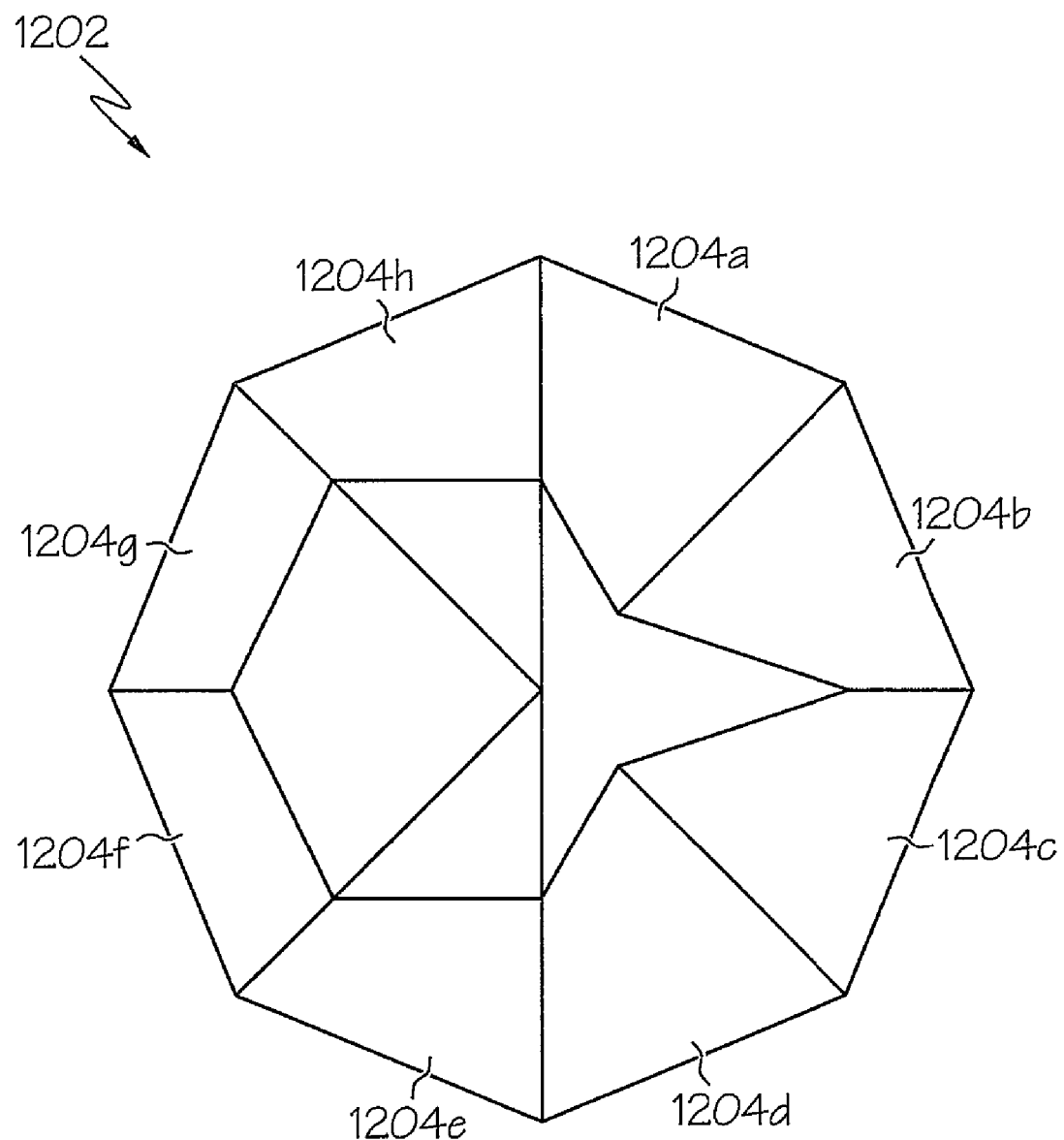
FIG. 12 depicts an exemplary intelligent icon having the form of a spider chart.

Assume for exemplary purposes that each icon in the example shown in FIG. 11 describes eight pieces of data (either raw data, or more preferably, emergent information such as that described above). This data can be depicted in an 8-way spider chart, as shown in further detail as spider chart icon 1202 in FIG. 12. Each of the axes (i.e., "pie pieces") 1204a-h represent a pre-determined characteristic to be continuously updated about all vessels which enter the area of interest. For example, assume that spider chart icon 1202 is the same icon as first emergent information icon 1104 shown in FIG. 11. As such, then axis 1204a may represent the "degree of certainty" that the represented marine vessel is "friendly"; axis 1204b may represent the capabilities of the represented friendly marine vessel has to interdict the hostile marine vessel represented by the second emergent information icon 1106; axis 1204c may represent the flexibilities that the friendly marine vessel has in reconfiguring her weapons, altering her mission orders, etc.; axis 1204d may represent the depth of support (e.g., back-up assets such as air support, etc.) that the friendly marine vessel has; axis 1204e may represent the readiness capability (e.g., based on real-time status of weapons systems, propulsion systems, communication systems, etc.) of the friendly marine vessel; axis 1204f may represent the constraints (e.g., legal and/or political restrictions on use of the friendly marine vessel); axis 1204g may represent the experience (e.g., of the ship itself and/or crew) of the friendly marine vessel in intercepting hostile ships; and axis 1204h may represent the past interdiction successes (e.g., history of successful interdictions, number of casualties incurred and/or inflicted, etc.) of the friendly marine vessel. Alternatively, axis 1204h may represent the present chance of interdiction success in interdicting the hostile marine vessel, based on the distance between the friendly and hostile vessel, weather conditions, and/or a combination of factors represented by axes 1204a-g.

Similarly, assume for continued exemplary purposes that spider chart icon 1202 is the same icon as first emergent information icon 1106 shown in FIG. 11. As such, then axis 1204a may represent the "degree of certainty" that the represented marine vessel is "hostile"; axis 1204b may represent the capabilities of the represented hostile marine vessel (represented by second emergent information icon 1106) has to repel or elude an interdiction by the friendly vessel represented by the first emergent information icon 1104; axis 1204c may represent the flexibilities that the hostile marine vessel has in reconfiguring her weapons, altering her route, etc.; axis 1204d may represent the depth of support (e.g., back-up assets such as other hostile craft, on-board weaponry etc.) that the hostile marine vessel has; axis 1204e may represent the readiness capability (e.g., based on real-time status of weapons systems, propulsion systems, communication systems, etc.) of the hostile marine vessel; axis 1204f may represent the constraints (e.g., legal and/or political restrictions that may be imposed on the hostile marine vessel; axis 1204g may represent the experience (e.g., of the ship itself and/or crew) of the hostile marine vessel in evading interception by friendly marine vessels; and axis 1204h may represent the past interdiction successes (e.g., history of successful evasions of interdictions, number of casualties incurred and/or inflicted, etc.) of the hostile marine vessel. Alternatively, axis 1204h may represent the present chance that the hostile marine vessel will be able to elude or overcome an interdiction action, based on the distance between the friendly and hostile vessel, weather conditions, and/or a combination of factors represented by axes 1204a-g.

Note that in a preferred embodiment, the only intelligence-driven icons that are displayed (preferably in real-time) are those that meet a certain threshold of interest based on above described emergent information. In alternate embodiment, the map displays all vessels, including those that meet certain pre-set parameters within the eight characteristics described in exemplary manner above.

Note also that a Service Oriented Architecture (SOA) service, using an administrative system, establishes a pattern of different data items, captures the relevant information about each data item from other systems which contain the data, apply rules associated with the particular data pattern about each data item to determine its "match" against the pattern of parameters associated with that data item, and then displays its relative strength against that pattern by filling in a line area and filling it with a color signaling its importance. For example, green could be small importance against the parameters, to about 2 or 3 on 10 point scale, yellow representing 4 to 7 on a 10 point scale, and red representing 8 to 10 as in the spider chart icon 1202 shown in FIG. 12. Thus, in the spider chart icon 1202 shown in FIG. 12, axes 1204a-d represent data that is relatively insignificant since a relatively small area of the axes are filled in, while axes 1204e-f, being filled in more fully (and thus representing more data that meets the parameters represented by these axes), are color-coded as being more significant.

Figure 13:
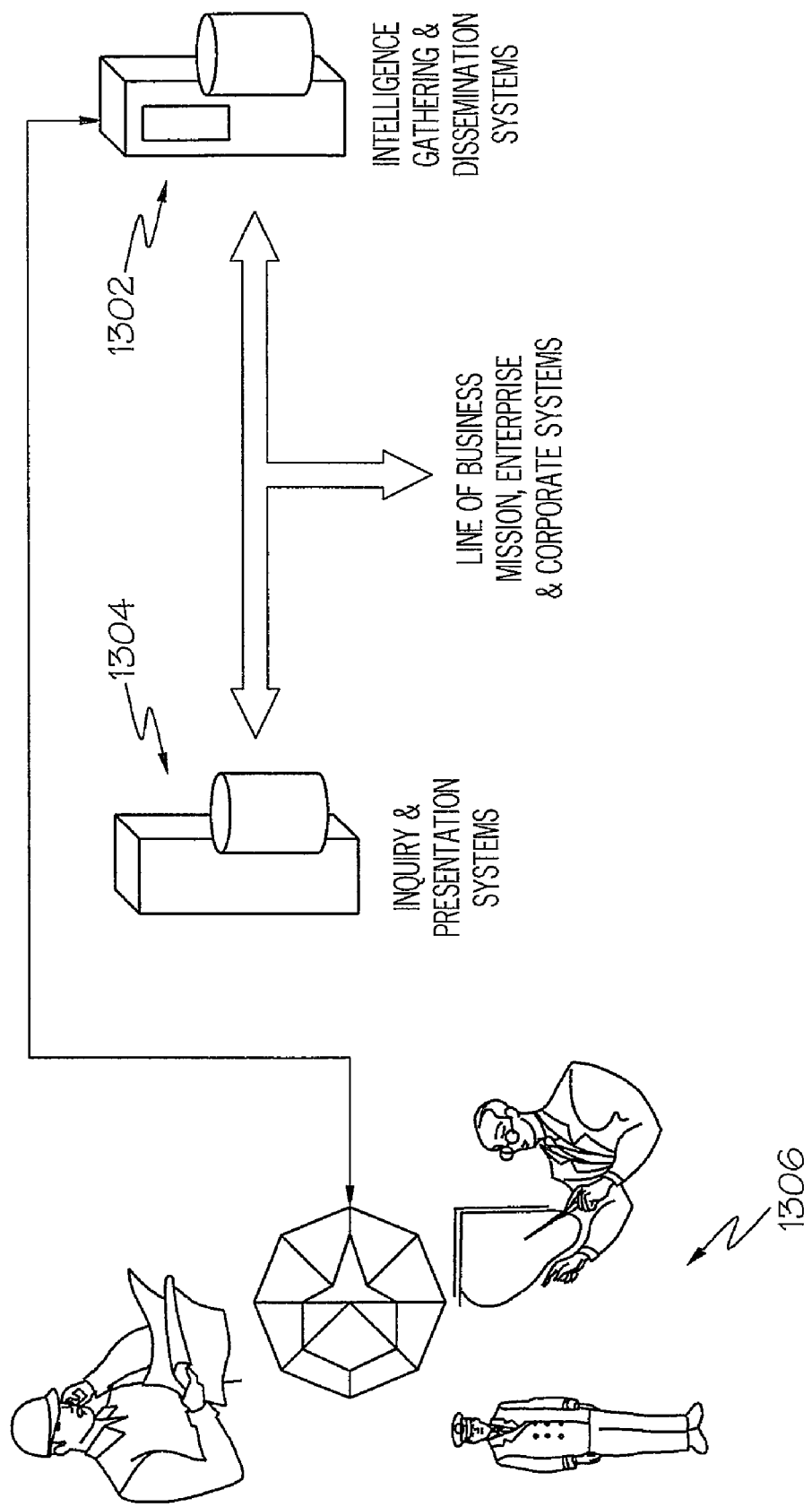
FIGS. 13-14 describe a data push function for creating intelligent icons.
Figure 14:
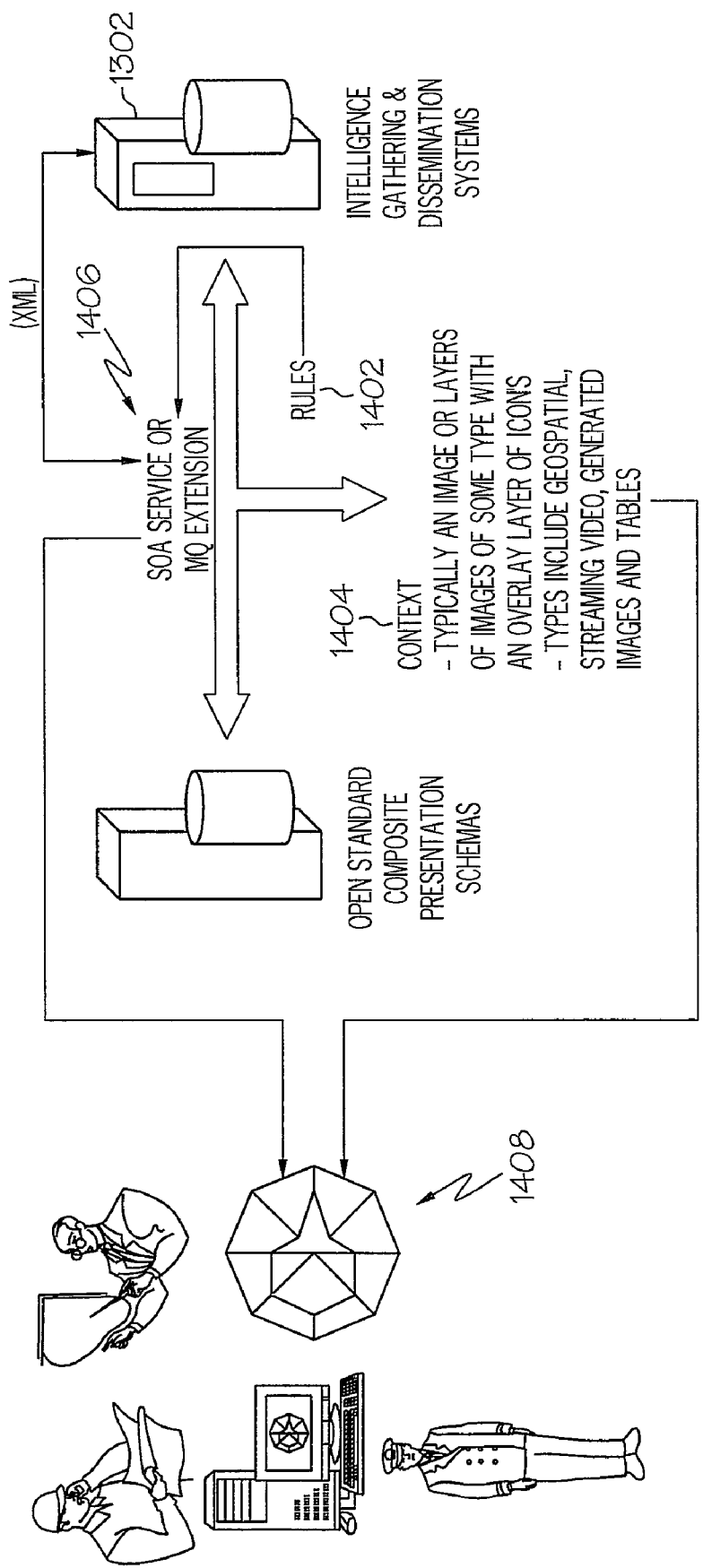

As noted above, the example shown in FIG. 11 is for a "push" icon, in which data is "pushed" to the user. As shown in FIG. 13, such a "push" system takes data from intelligence gathering and dissemination systems 1302 (such as the system shown in FIG. 1) and pushes the developed emergent data to the inquiry and presentation systems 1304, where it can be utilized by users 1306. As depicted in FIG. 14, this "push" system can be further refined by imposing certain rules 1402 and context 1404. That is, the rules can be part of the SOA service 1406, such that emergent information from the intelligence gathering and dissemination systems 1302 only occurs when certain rules (based on political, financial, legal, and other factors) are met by current circumstances. Note that in one embodiment, the intelligence-based icon 1408 is created using open standard composite presentation schemas.

Figure 15:
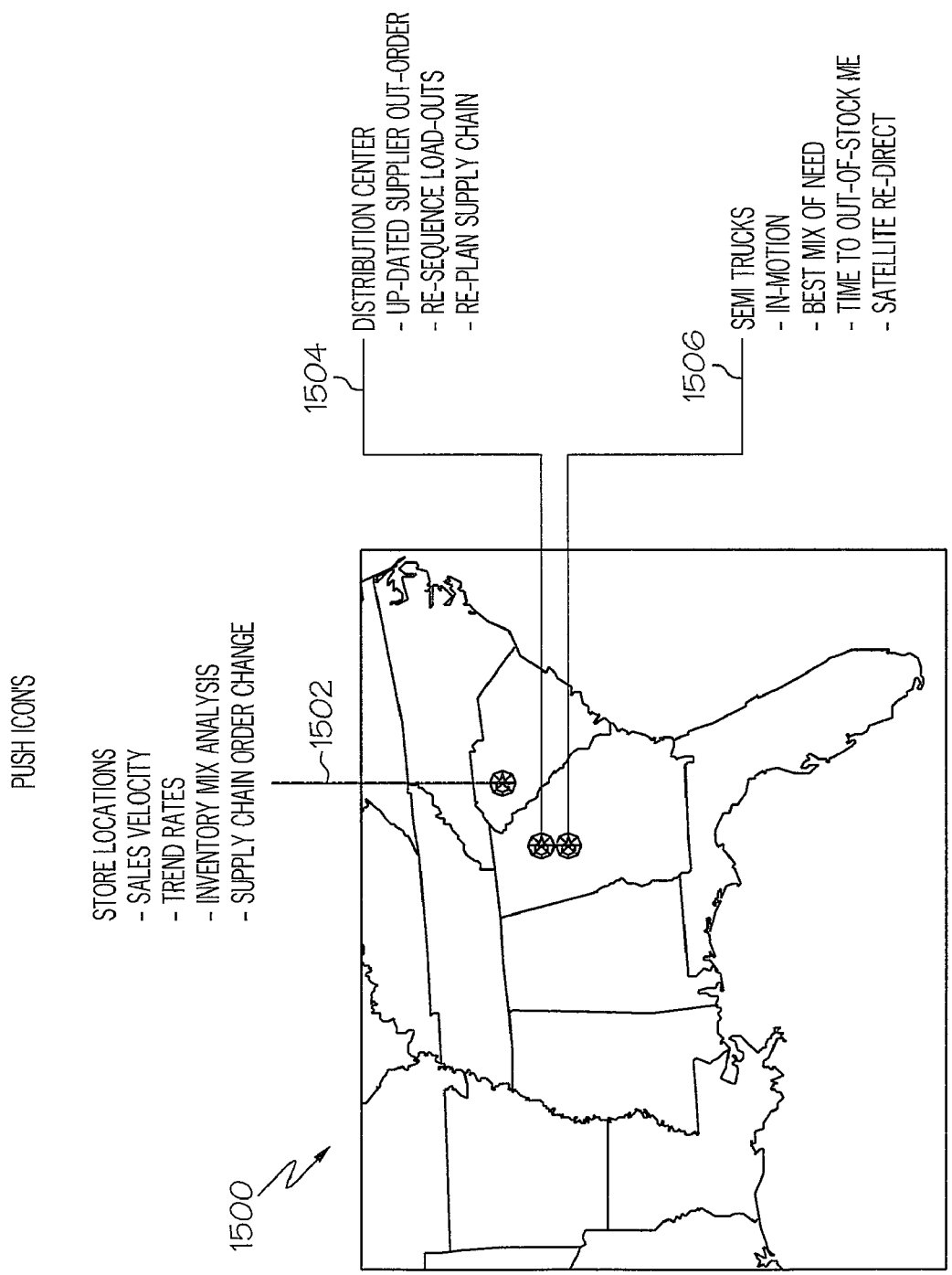
FIG. 15 is a map showing the use of intelligent icons in a retail environment.

Interdiction of criminals is but one exemplary use of the intelligent spider chart icon 1202 or similar intelligent icon. For example, as shown in FIG. 15, a similar system can be used in a map 1502 for a grocery store chain. Icons are created for stores 1502, distribution centers 1504, and transportation (trucks 1506), by using parameters shown in the figure. Interactions between the stores 1502, distribution centers 1504 and trucks 1506 are represented in a intelligently selective manner, in order to facilitate product distribution to the stores 1502. For example, assume that a particular store 1502, represented by an intelligent icon such as the spider chart icon 1202 described above, is about to run out of a particular product. By simultaneously clicking intelligent icons for a particular distribution center 1504 and/or truck 1506, the relevant axes ("pie pieces" in a spider chart icon) will change in appearance according to real-time emergent information about the players. Thus, by clicking the icon for the store location, and then clicking different icons for different distribution centers and/or trucks, a rapid visual representation will be shown to the user regarding which distribution center and/or truck can best provide the store with the needed product.

Figure 16:
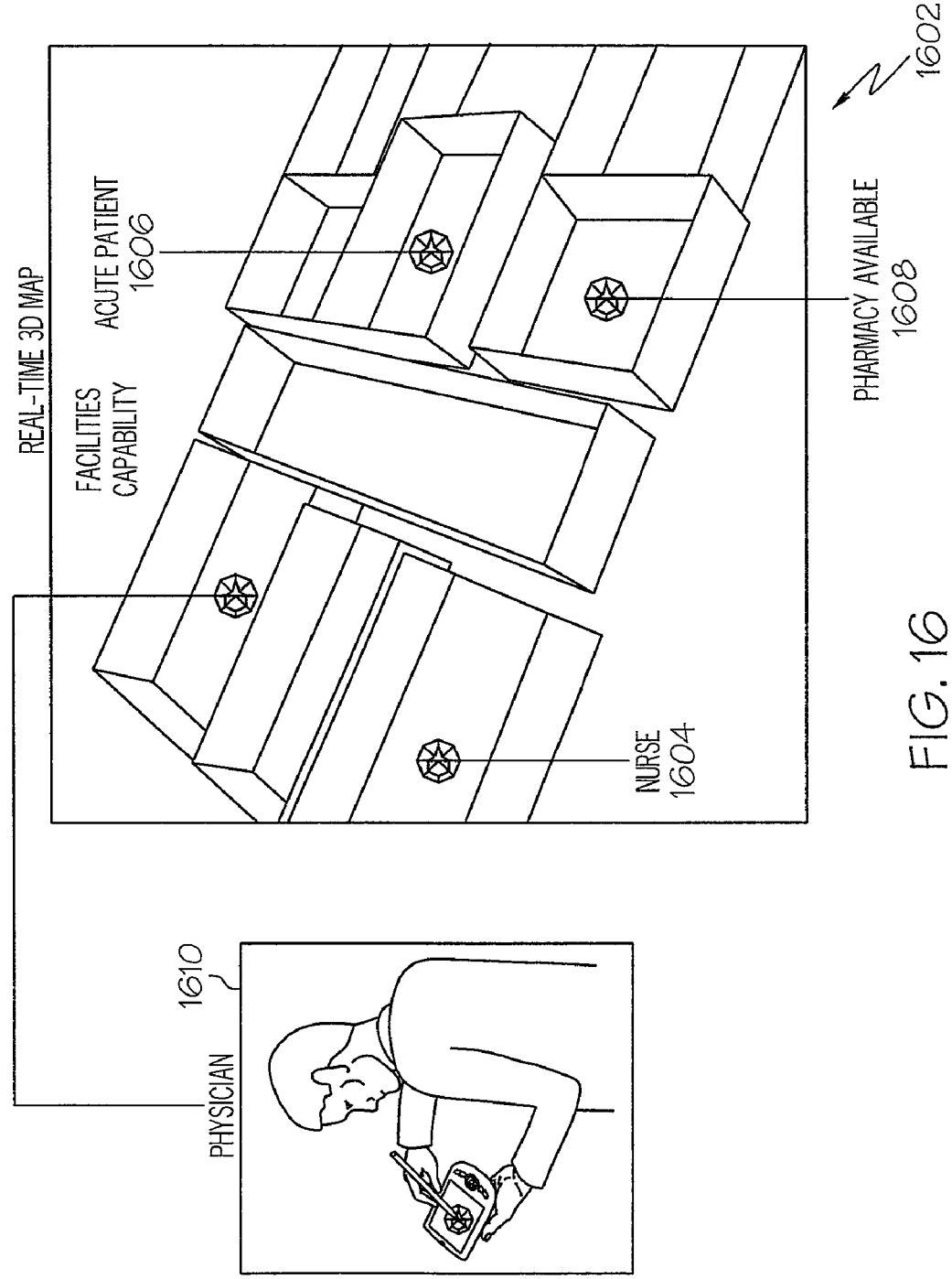
FIG. 16 is a map showing the use of intelligent icons in a health care environment.

Another exemplary push icon system is shown for a health care example in real-time three-dimensional map 1602 in FIG. 16. Assume that a nurse 1604 knows that an acute patience 1606 is in immediate need of medicine from a pharmacy 1608. However, permission to push the meds must first be obtained from an physician 1610, who is preferably the attending physician for the acute patient 1606. Speed is of the essence. By displaying the map 1602 on a PDA or similar device to the nurse 1604 and/or physician 1610, icons are displayed for the patient 1606, physician 1610, nurse 1604 and pharmacy 1608. Thus, the intelligent icon for the pharmacy 1608 may show whether pharmacy 1608 has the needed medicine (based on communication with the intelligence behind the icon for acute patient 1606). Icons displayed on the nurse's PDA may show not only that the pharmacy 1608 has the needed medication, but also that the physician 1610 in the next room is in fact the attending physician for the acute patient 1606.

Figure 17:
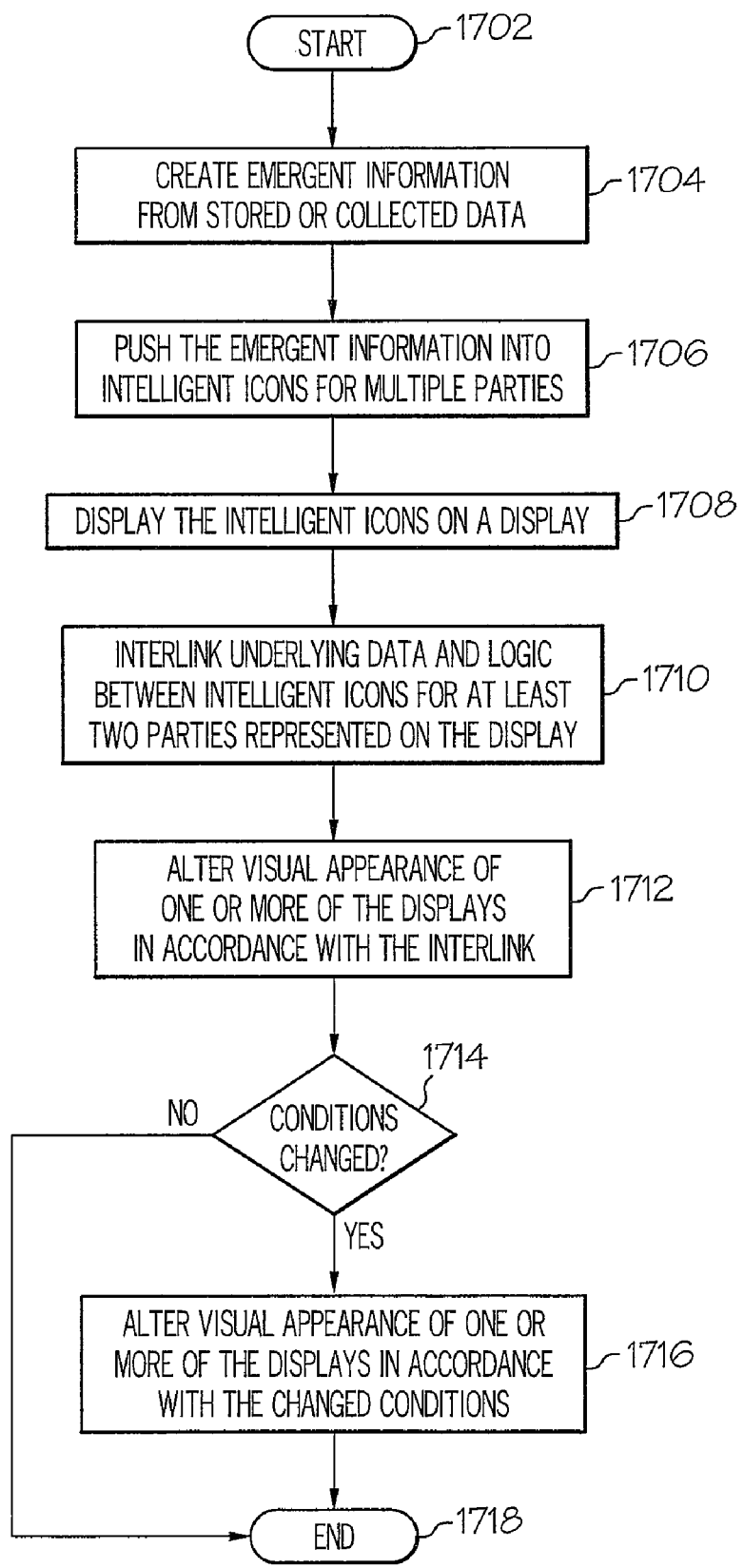
FIG. 17 is a flow-chart of exemplary steps taken to create and manage intelligent icons.

Referring now to FIG. 17, a flow-chart of exemplary steps taken to create and utilize an intelligent icon in a push system is presented. After initiator block 1702, emergent information is created (block 1704), either from sensors or from a database, as described above. This emergent information is then pushed (block 1706) into intelligent icons for multiple parties, including those described in exemplary manner in FIGS. 11-16. These intelligent icons are then displayed (block 1708). Different icons are interlinked according to their underlying logic and data (block 1710), as described in exemplary manner above by clicking two or more intelligent icons. The underlying data may be the raw data, emergent data, or a combination thereof. The underlying logic is a relational descriptor that describes the relationship and interaction between two parties that are represented by the intelligent icons. For example, an underlying logic may include a descriptor that whenever the underlying data for a first intelligent icon causes that intelligent icon to have a particular appearance, then another intelligent icon will appear on a display, based on the underlying functional and relational characteristics of the two parties being represented by the two intelligent icons. Thus, this interlinking causes the intelligent icons to alter their appearance in a manner representative of the relationship between the parties represented by the icons (block 1712). If local conditions and/or the relationship between the parties changes (block 1714), then the visual appearance of the intelligent icons also changes in real-time to reflect these changes (block 1716). The process ends (terminator block 1718) when the emergent information is no longer needed to be displayed to a user.

Figure 18:
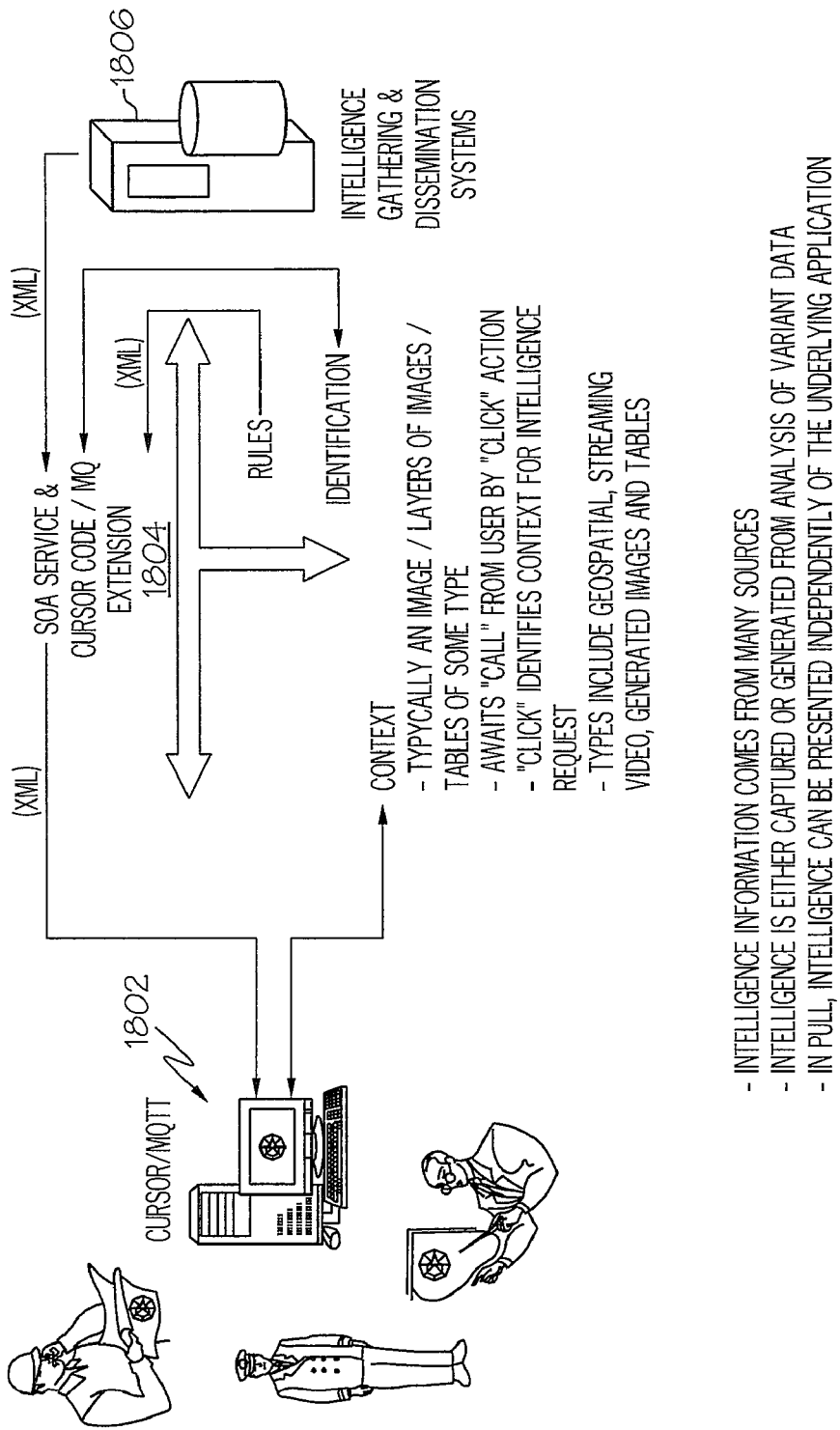
FIG. 18 describes a data pull function used with intelligent icons.
Figure 21:
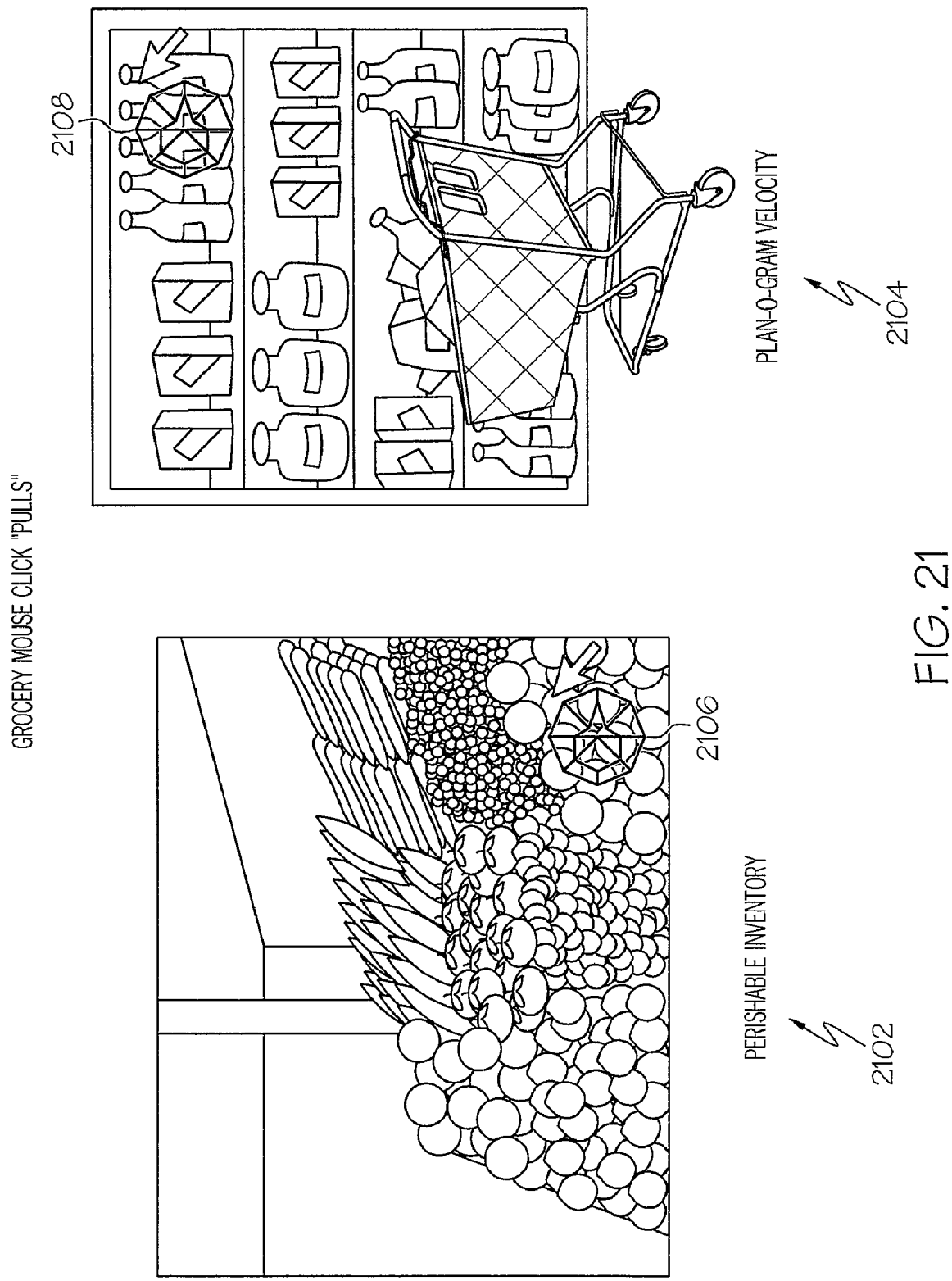
FIG. 21 illustrates the use of data pull with intelligent icons in a grocery market scenario.

Note that, as described in FIG. 18, intelligent cursors can be used to "pull" data. As utilized herein, an intelligent cursor is defined as a cursor that has additional software, added to the cursor's host system, which adds the functionality of "pulling" (requesting) intelligent data (e.g., emergent information) related to the object that is clicked on at the cursor. Thus, an intelligent cursor 1802 can be clicked to cause underlying data to be displayed, in accordance with rules, identification and context set by the SOA service 1804 from the intelligence gathering and dissemination systems 1806.

For example, consider now the data table 1902 shown in FIG. 19. By placing an intelligent cursor 1904 over a particular data entry (e.g., for a particular stock), an instant analysis of underlying data (not shown) is presented. That is, the underlying data that caused the intelligent cursor 1904 to have a particular visual appearance (e.g., high earnings, reported legal problems, labor issues, etc. for a particular entry) is then pulled and displayed.

Detailed data can be pulled for areas including production lines 2002, airplanes 2004, automobiles 2006, etc. as shown in FIG. 20. That is, assume that the intelligent cursor 2008 shows that production is low (as suggested by the particular shading of one or more pie pieces in the intelligent cursor 2008). By clicking the intelligent cursor 2008, the underlying data and/or logic (that decided that the data should be represented in a manner that indicates a problem) is pulled up and displayed (in another screen—not shown). Similarly, underlying data and/or logic for problems (or non-problems) may be displayed for aeronautical systems in the display for the airplane 2004 or automobile 2006.

Likewise, data can be pulled by clicking the intelligent cursors shown in a display 2102 of real-time stock in a store, or for a representation of a plan-o-gram 2104. That is, assume that underlying logic recognizes the produce stock in the real-time picture shown as display 2102. Hovering the intelligent cursor 2106 over a particular produce can connect to underlying logic that "knows" that the produce is getting over-ripe (due to having been in the bin for several days), and thus it should be put on sale at a reduced price to move it, or else thrown away. Similarly, if products in a plan-o-gram (plan for when items are stocked in accordance with their history of sales, financial incentives made to the store by the manufacturer of particular products to gain optimal placement, etc.) need to be rearranged, this will be made obvious by hovering an intelligent cursor 2108 over particular items in the plan-o-gram.

Figure 22:
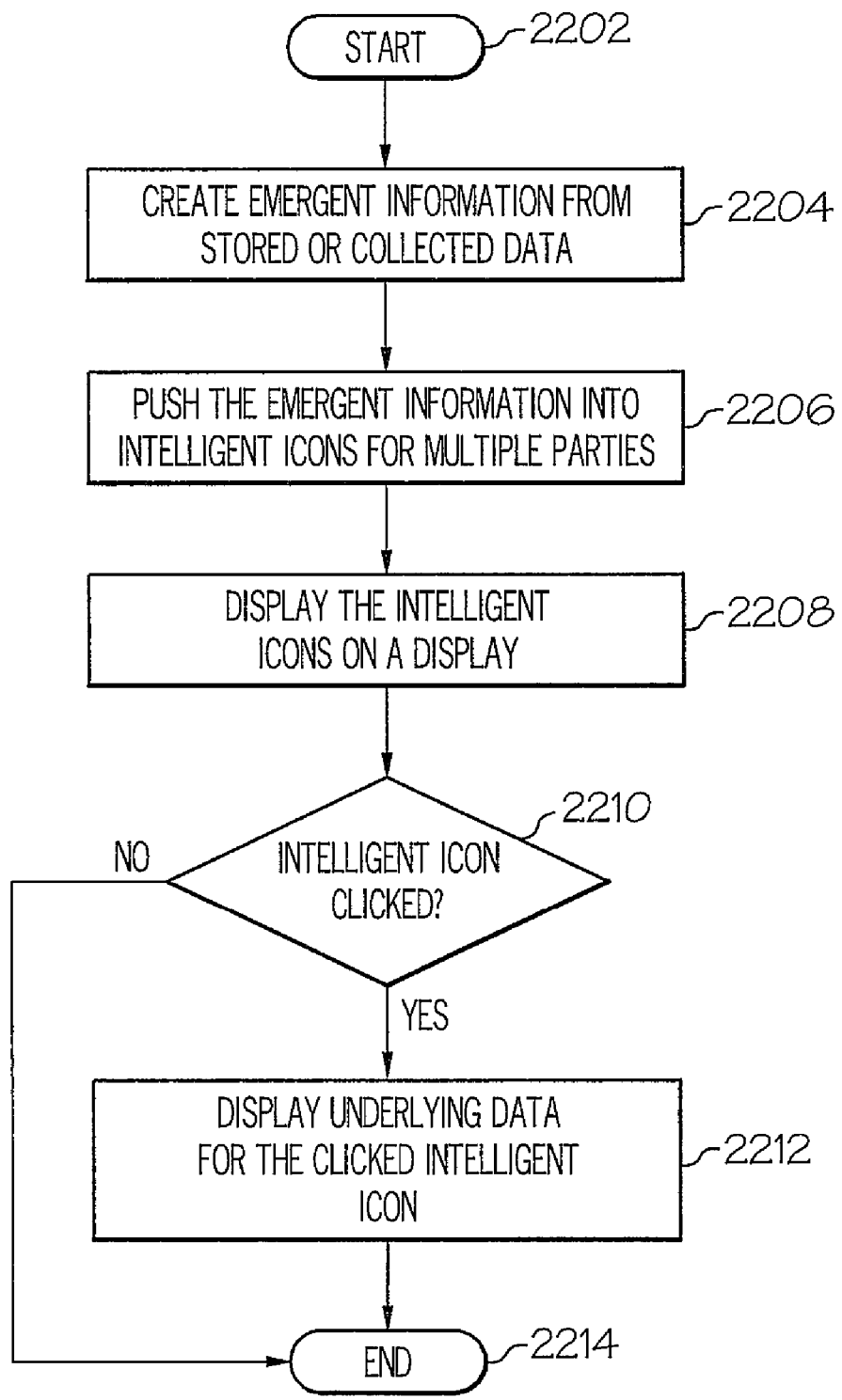
FIG. 22 is a flow-chart showing exemplary steps taken to utilize a data pull functionality of intelligent icons.

With reference now to FIG. 22, a flow-chart showing exemplary steps taken to "pull" data using an intelligent cursor is presented. After initiator block 2202, emergent data is created (block 2204) in a manner as described above. This emergent data is then pushed into intelligent icons for multiple parties that are depicted on a map or other graphical representation (block 2206), where they are displayed (block 2208). Such an intelligent icon then functions as an intelligent cursor, which can be used to pull underlying data. If a user clicks such an intelligent cursor (query block 2210), then the underlying data for that intelligent cursor is presented (block 2212). This data may be either raw data (e.g., that data shown in display 122 in FIG. 1 above) or emergent data (e.g., that emergent data shown in display 124 in FIG. 1). Assuming that no additional data is to be pulled by the user, the process ends at terminator block 2214.

Note that all of the intelligent icons and cursors described herein preferably utilize a SOA service.

The present invention thus overcomes many deficiencies found in the prior art. These deficiencies included, but were not limited to, (a) the sensor, even if "smart," does not create any leverage or act as anything other than an event tripper. All analysis is performed in a central service, and (b) there are many single points of failure including, but not limited to: if a sensor fails, if the communication channel to the sensor is down, or if the data mining programs are too slow or not searching for the right combinations to match the latest variation of activity. If these sensors are used in law enforcement or military situations, for example, the people or objects of interest are constantly changing behaviors to avoid detection. If used in medicine, small variations person to person can cause basic observations to be inadequate or even lead to wrong conclusions.

The present invention, however, overcomes these deficiencies in the prior art by providing a robust, local intelligent network that is capable of autonomously detecting and correcting problems in the field, without waiting for direction from a remote controller logic. As described herein, this invention reverses trend of using sensors that are fettered to a remote controller, and instead deploys pre-designed systems focused on the search for patterns in fields of different types of sensors based on pre-downloaded, likely combinations, of data points, or emergent information patterns. A point of departure for developing these search patterns to be downloaded into the sensor fields includes the patterns searched for after the data is all collected in the current approach. This is a sensor "grid" computing system, where the sensors themselves are smart, and interact with each other with a short-range communications protocol such as zigbee. This constant intercommunication between sensors provides each sensor with a chance to constantly "vote" as to whether they have a known pattern they need to report, and note the pattern against several or more already downloaded patterns at once. There are many new patterns of search possible. Periodic reporting of a "no op" retains the network's confidence that it is still operating.

This new approach also creates a low power consumption profile for each sensor because they don't have to report "no op" all the time. Rather, each sensor in the field can take turns reporting for the whole field. This approach provides many network paths to get a report out when needed since each individual sensor, in a zigbee type network, can be connected separately and report for all. This approach also provides for deterministic realtime data processing, such that constant addition, deletion, and changes of patterns can be analyzed. Furthermore, some of the field sensors can be out (disabled, off-line, powered down, "asleep") and the overall field can still be successful, since in numbers there is built-in redundancy, and with patterns, the system can provide a tentative "yes" vote (for reporting an anomaly) with some predetermined percentage (e.g. two-thirds) of the sensors reporting information that conforms to a pre-defined anomaly pattern.

Furthermore, the present invention intelligently displays emergent information using a new system, process, and method that concentrates a tremendous amount of intelligence into a very small visual space by substituting a complex graphic (intelligent icon), such as a spider chart or a complex graph, for the common icon or the cursor. This display occurs in deterministic real time, and thus provides extensive decision-making support for the large number of circumstances in which a human has only a small amount of time to sort through previously large amounts of disparate information.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A system comprising:
   a processor;
   a data bus coupled to the processor;
   a memory coupled to the data bus; and
   a computer-usable medium embodying computer program code, the computer program code comprising instructions executable by the processor and configured for visually representing emergent information by performing the steps of:
   creating emergent information from underlying data;
   creating at least one intelligent icon from the emergent data, wherein the at least one intelligent icon is visually coded to represent the emergent data for one or more specific parties on a visual display;
   displaying at least one intelligent icon on the visual display, wherein the at least one intelligent icon presents information needed by a user to react to the emergent information, and wherein the intelligent icon is a spider chart;
   interlinking the underlying data and logic for multiple parties on the visual display by clicking different intelligent icons for each of the multiple parties, wherein the multiple parties comprise a specific retail store, a specific distribution center, and a specific transportation vehicle, and wherein the altering of the visual coding depicts an effectiveness of utilizing the specific distribution center and the specific transportation vehicle for providing a particular product to the specific retail store;
   in response to the interlinking, altering a visual coding of intelligent icons associated with the multiple parties; and
   reacting to the emergent information by initiating physical action that results in the emergent information being changed.

2. The system of claim 1, wherein the instructions are further configured for:
   interlinking the underlying data and logic for multiple parties on the visual display by clicking different intelligent icons for each of the multiple parties;
   in response to the interlinking, altering a visual coding of intelligent icons associated with the multiple parties; and
   reacting to the emergent information by initiating physical action that results in the emergent information being changed.

3. The system of claim 2, wherein the multiple parties comprise a friendly marine vessel and a hostile marine vessel, and wherein the altering of the visual coding represents a likelihood that the friendly marine vessel is capable of interdicting the hostile marine vessel.

4. The system of claim 2, wherein the multiple parties comprise a specific retail store, a specific distribution center, and a specific transportation vehicle, and wherein the altering of the visual coding depicts an effectiveness of utilizing the specific distribution center and the specific transportation vehicle for providing a particular product to the specific retail store.

5. The system of claim 1, wherein the intelligent icon is a spider chart.

6. A computer-readable storage medium embodying computer program code, the computer program code comprising instructions executable by the processor and configured for visually representing emergent information by performing the steps of:
   creating emergent information from underlying data;
   creating at least one intelligent icon from the emergent data, wherein the at least one intelligent icon is visually coded to represent the emergent data for one or more specific parties on a visual display; and
   displaying at least one intelligent icon on the visual display, wherein the at least one intelligent icon presents information needed by a user to react to the emergent information, and wherein the intelligent icon is a spider chart;
   interlinking the underlying data and logic for multiple parties on the visual display by clicking different intelligent icons for each of the multiple parties, wherein the multiple parties comprise a specific retail store, a specific distribution center, and a specific transportation vehicle, and wherein the altering of the visual coding depicts an effectiveness of utilizing the specific distribution center and the specific transportation vehicle for providing a particular product to the specific retail store;
   in response to the interlinking, altering a visual coding of intelligent icons associated with the multiple parties; and
   reacting to the emergent information by initiating physical action that results in the emergent information being changed.

7. The computer readable storage medium of claim 6, wherein the instructions are further configured for:
   interlinking the underlying data and logic for multiple parties on the visual display by clicking different intelligent icons for each of the multiple parties;
   in response to the interlinking, altering a visual coding of intelligent icons associated with the multiple parties; and
   reacting to the emergent information by initiating physical action that results in the emergent information being changed.

8. The computer readable storage medium of claim 7, wherein the multiple parties comprise a friendly marine vessel and a hostile marine vessel, and wherein the altering of the visual coding represents a likelihood that the friendly marine vessel is capable of interdicting the hostile marine vessel.

9. The computer readable storage medium of claim 7, wherein the multiple parties comprise a specific retail store, a specific distribution center, and a specific transportation vehicle, and wherein the altering of the visual coding depicts an effectiveness of utilizing the specific distribution center and the specific transportation vehicle for providing a particular product to the specific retail store.

10. The computer-readable storage medium of claim 6, wherein the computer-usable medium is a component of a remote server, and wherein the computer executable instructions are deployable to a local computer from the remote server.

11. The computer-readable storage medium of claim 6, wherein the computer executable instructions are capable of being provided by a service provider to a customer on an on-demand basis.

* * * * *